(12) United States Patent
Hopely, Jr. et al.

(10) Patent No.: US 6,341,657 B1
(45) Date of Patent: Jan. 29, 2002

(54) SUSPENSION FOR CENTRAL DRIVE VEHICLE

(75) Inventors: Robert C. Hopely, Jr., Sewell, NJ (US); Anthony P. DiGiovanni, Bradenton, FL (US)

(73) Assignee: Electric Mobility Corporation, Sewell, NJ (US)

( * ) Notice: Subject to any disclaimer, the term of this patent is extended or adjusted under 35 U.S.C. 154(b) by 0 days.

(21) Appl. No.: 09/443,012

(22) Filed: Nov. 18, 1999

Related U.S. Application Data

(60) Provisional application No. 60/109,071, filed on Nov. 18, 1998.

(51) Int. Cl.[7] ............................ B60K 1/00; B60K 7/00; B62D 61/10; B60G 11/02
(52) U.S. Cl. .................. 180/6.5; 180/24.07; 180/55; 180/65.5; 180/65.6; 180/907; 280/124.17; 280/124.175; 267/41
(58) Field of Search ................ 180/6.48, 6.5, 180/6.62, 6.66, 22, 23, 24.07, 55, 58, 60, 62, 65.5, 65.6, 65.1, 907, 908; 280/124.131, 124.17, 124.175, 788, FOR 156, FOR 175, FOR 177; 267/41

(56) References Cited

U.S. PATENT DOCUMENTS

| 1,158,026 A | * | 10/1915 | Buffum ........................ 267/41 |
| 1,656,175 A | * | 1/1928 | De Benedetti ......... 280/124.17 |
| 2,152,573 A | * | 3/1939 | Turner ........................ 280/788 |
| 3,876,041 A | | 4/1975 | Pivacek |
| 3,902,758 A | | 9/1975 | Pivacek |
| 3,952,822 A | | 4/1976 | Udden et al. |
| 3,953,054 A | | 4/1976 | Udden et al. |
| 4,082,348 A | | 4/1978 | Haury |
| 4,245,847 A | | 1/1981 | Knott |
| 4,310,167 A | | 1/1982 | McLaurin |
| 4,387,325 A | | 6/1983 | Klimo |
| 4,407,383 A | * | 10/1983 | Enokimoto et al. ......... 180/908 |
| 4,424,873 A | | 1/1984 | Terlaak |
| 4,500,102 A | | 2/1985 | Haury et al. |
| 4,511,825 A | | 4/1985 | Klimo |
| 4,513,832 A | | 4/1985 | Engman |
| 4,538,857 A | | 9/1985 | Engman |

(List continued on next page.)

FOREIGN PATENT DOCUMENTS

| EP | 0338689 A2 | 10/1989 |
| FR | 2215054 | 8/1974 |
| FR | 2383822 | 10/1978 |
| FR | 2399822 | 3/1979 |
| GB | 2132954 | 7/1984 |
| WO | WO 90/06097 | 6/1990 |
| WO | WO 91/17077 | 11/1991 |

OTHER PUBLICATIONS 8 page brochure entitled "Permobile Power Chairman Empowering the Human Spirit"(1995–1996).
16 page brochure entitled "Bodyprint Designs Winter Catalogue 1995–1996"(1995).
4 page brochure entitled "Orthofab V.I.P. Mobiltiy for Everyone"(1995–1996).

(List continued on next page.)

Primary Examiner—Peter C. English
(74) Attorney, Agent, or Firm—Frijouf, Rust & Pyle, P.A.

(57) ABSTRACT

A central drive personal mobility vehicle is disclosed comprising a frame having a right and a left frame mounting located in a trailing frame portion of the frame with a seat being mounted to an intermediate portion of the frame. A right and a left leaf spring extend between a proximal end and a distal end. The proximal ends of the right and left leaf springs are secured to a right and a left drive wheel assembly supporting a left and a right drive wheel. The distal ends of the right and left leaf springs are secured to the right and left frame mounting for resiliently mounting the right and left drive wheel assemblies to the frame.

22 Claims, 14 Drawing Sheets

U.S. PATENT DOCUMENTS

| | | | |
|---|---|---|---|
| 4,555,121 A | | 11/1985 | Lockard et al. |
| 4,595,212 A | | 6/1986 | Haury et al. |
| 4,634,941 A | | 1/1987 | Klimo |
| 4,721,321 A | | 1/1988 | Haury et al. |
| 4,805,925 A | | 2/1989 | Haury et al. |
| 4,813,693 A | | 3/1989 | Lockard et al. |
| 4,840,390 A | | 6/1989 | Lockard et al. |
| 4,887,830 A | | 12/1989 | Fought et al. |
| D305,521 S | | 1/1990 | Wiatrak et al. |
| 4,981,305 A | | 1/1991 | Lockard et al. |
| 4,989,890 A | | 2/1991 | Lockard et al. |
| 5,033,793 A | | 7/1991 | Quintile |
| 5,094,310 A | | 3/1992 | Richey et al. |
| 5,121,938 A | | 6/1992 | Gross et al. |
| 5,145,020 A | | 9/1992 | Quintile et al. |
| 5,154,251 A | | 10/1992 | Fought |
| 5,170,826 A | | 12/1992 | Carstensen et al. |
| 5,183,133 A | | 2/1993 | Roy et al. |
| 5,195,803 A | | 3/1993 | Quintile |
| 5,203,610 A | | 4/1993 | Miller |
| 5,240,086 A | * | 8/1993 | Hopely, Jr. ............ 280/124.17 |
| 5,263,728 A | | 11/1993 | Patel et al. |
| 5,294,141 A | | 3/1994 | Mentessi et al. |
| 5,364,120 A | | 11/1994 | Shimansky |
| 5,366,037 A | | 11/1994 | Richey |
| 5,378,045 A | | 1/1995 | Siekman et al. |
| 5,413,187 A | | 5/1995 | Kruse et al. |
| 5,435,404 A | | 7/1995 | Garin, III |
| 5,442,823 A | | 8/1995 | Siekman et al. |
| 5,445,233 A | | 8/1995 | Fernie et al. |
| D365,786 S | | 1/1996 | Peterson |
| D365,787 S | | 1/1996 | Peterson et al. |
| D365,788 S | | 1/1996 | Peterson |
| 5,531,284 A | | 7/1996 | Okamoto |
| 5,540,297 A | * | 7/1996 | Meier ........................ 180/6.5 |
| 5,575,348 A | | 11/1996 | Goertzen et al. |
| 5,592,997 A | | 1/1997 | Ball |
| 5,690,185 A | | 11/1997 | Sengel |
| 5,697,465 A | | 12/1997 | Kruse |
| 5,944,131 A | * | 8/1999 | Schaffner et al. .......... 180/65.1 |

OTHER PUBLICATIONS 4 page brochure entitled "Permobil for Kids"(1995–1996).
6 page brochure entitled "Quickie Power Products"(1995–1996).
8 page brochure entitled "Ligtvoet Products–Ligtvoet Modern Design"(1995–1996).
19 page brochure entitled "Meyra"(1995–1996).
8 page brochure entitled "Meyra Power Primus, Power Picco, Die Elektrischen Aktiven"(1995–1996).
8pg brochure entitled "Meyra Gin'us Modell 1.592 Sprint Von Meyra, Mayra Optimus, Sonderbedieneinheiten" (1995–1996).
2 sided flyer entitled "Puma Booster"(1995–1996).
2 sided flyer entitled "The Mangar Freestyle"(1995–1996).
6 page brochure entitled "Action Power Cruiser 4E"(1995–1996).
4 page brochure entitled "Aldersly Excel—The first of it's kind"(1995–1996).
6 page price list entitled "Are You Looking for a New Electic Wheelchair?" by Battery Chairs Limited, 24/26 Old Meeting Road, Coseley, West Midlands WV14 8HB, United Kingdom(1995–1996).
2 page flyer entitled "Little Dipper"(1995–1996).
2 page flyer entitled"Boing Colours by Permobil"(1995–1996).
2 page flyer entitled "Eclipse Colours 'N Motion"(1995–1996).
2 page flyer entitled "Impact Colours 'N Motion"(1995–1996).
2 page "Order Form" entitled "Colours by Permobil" for "The Avenger"(1995–1996).
2 page "Order Form" entitled "Colours by Permobile" "The Boing"(1995–1996).
2 page "Order Form" "Colours by Permobil" for "The Supermova Xtreme"(1995–1996).
2 page "Order Form" "Colours by Permobil" for "The Eclipse"(1995–1996).
2 page "Order Form" entitled "Colours by Permobil" for "The G–Force"(1995–1996).
2 page "Order Form" entitled "Colours by Permobil" for "The Impact"(1995–1996).
2 page "Order Form" entitled "Colours by Permobil" for "The Little Dipper"(1995–1996).
5 pg brochure entitled "LaBac Introduces it's tilt, ASB, and RSR on the Quickie P300 with 20" Wheels" (1995–1996).
8 page "Order Form" entitled "Kid Kart Cares About Kids"(1995–1996).
2 page flyer entitled "Hoveround Personal Mobility Vehicles"(1995–1996).
2 page flyer entitled "Chairman MPS Permobil Multi Position System"(1995–1996).
2 page Permobil order form entitled "Chair.Man Mini Flex"(1995–1996).
2 page Permobil order form entitled "Chair.Man Stander"(1995–1996).
2 page Permobil order form entitled "Chair.Man MPS"(1995–1996).
2 page Permobil order form entitled "Chair.Man Corpus"(1995–1996).
2 page Permobil order form entitled "Chair.Man Robo"(1995–1996).
2 page Permobil order form entitled "Chair.Man Mini Stander"(1995–1996).
3 page order form entitled "Kid Cart Cares About Kids"(1996).
1 page announcement entitled "Thank You for Your Interest In Permobil's Power Mobility Products"(1995–1996).

* cited by examiner

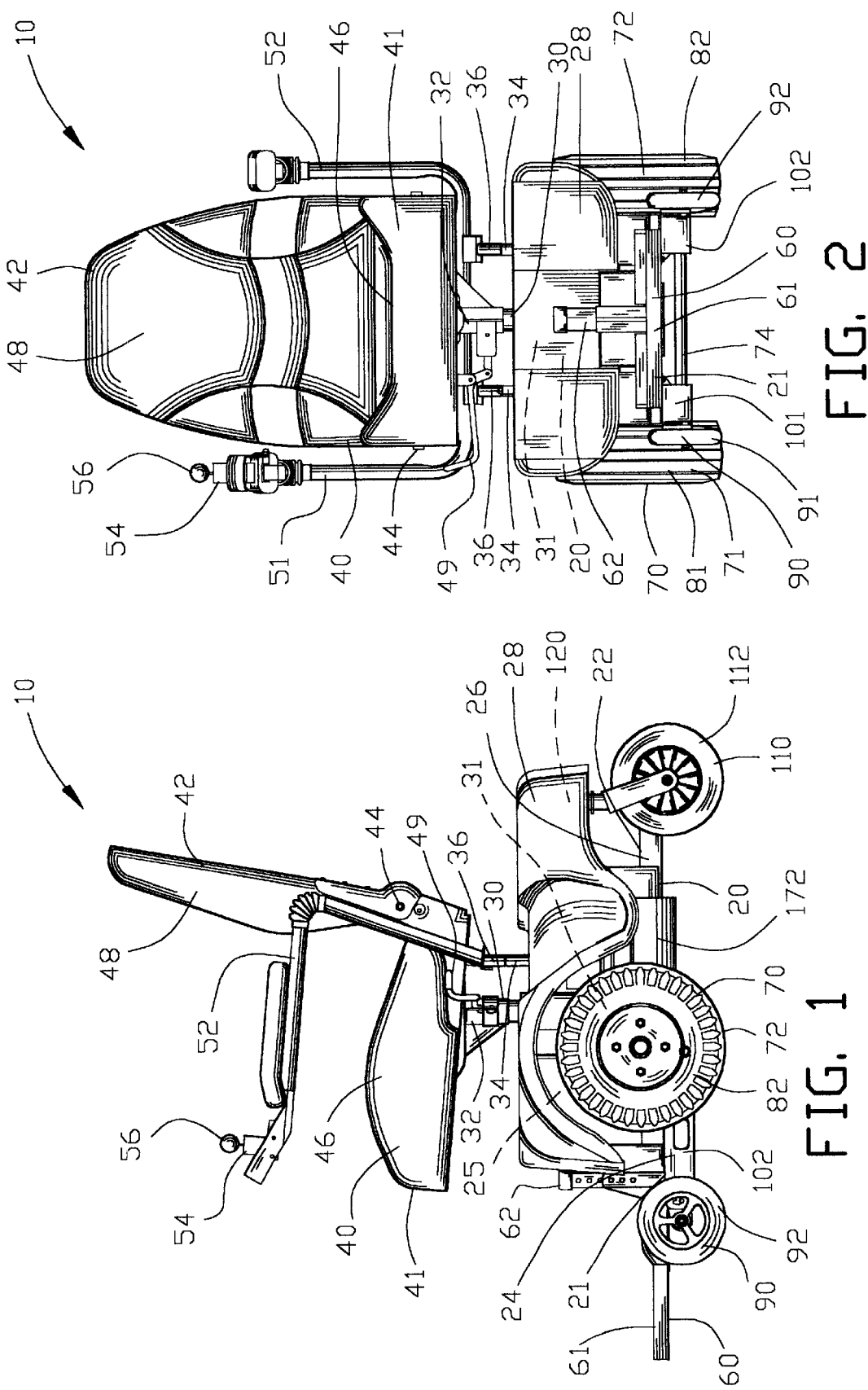

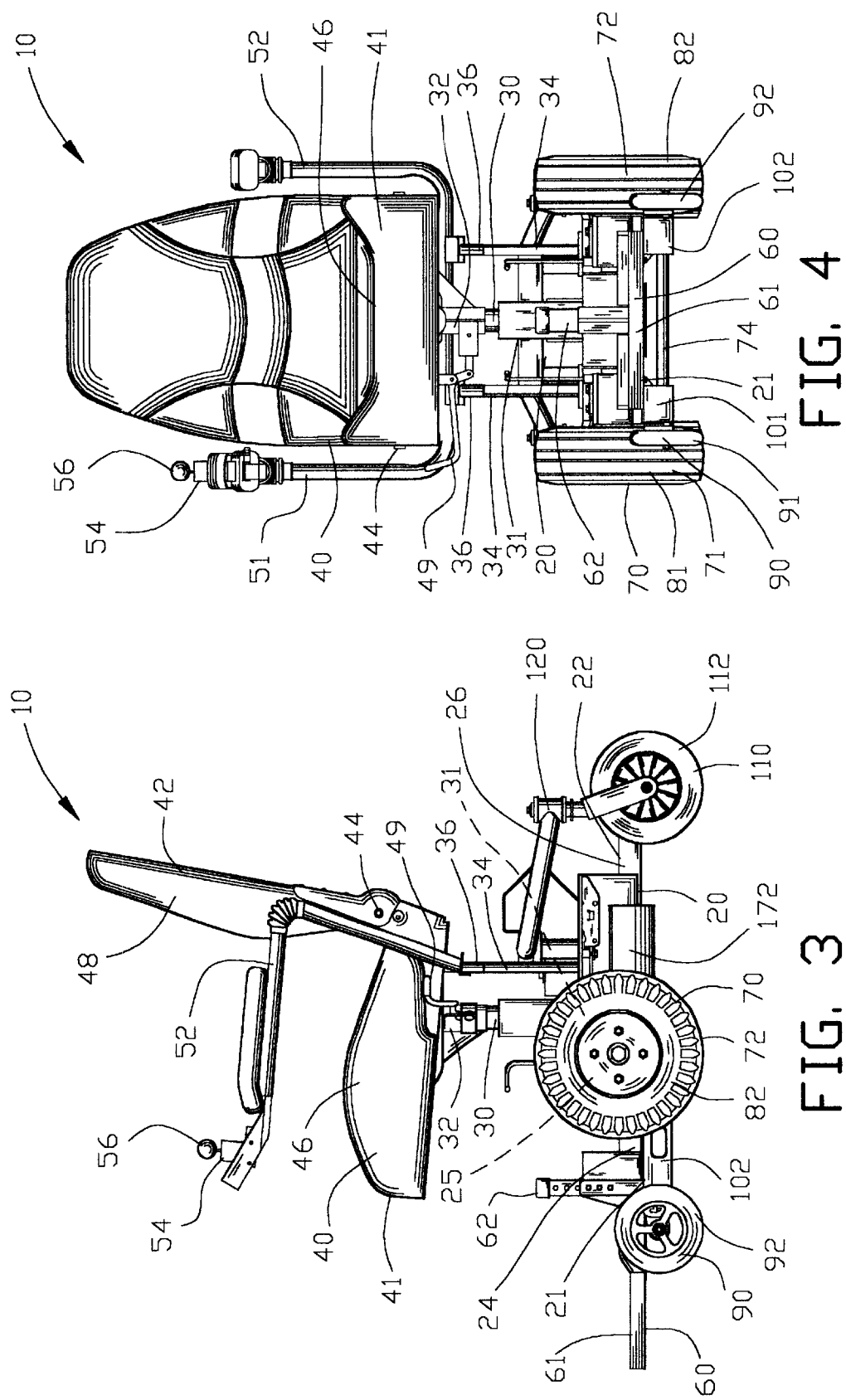

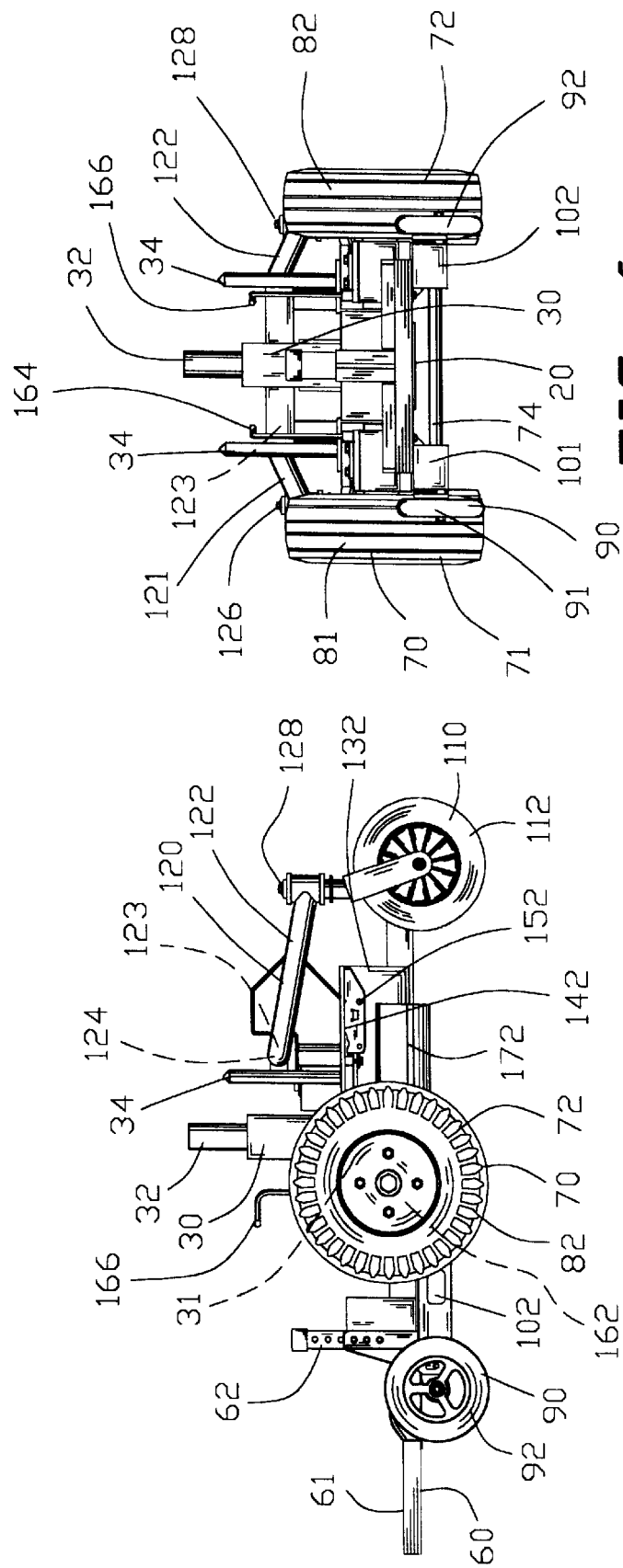

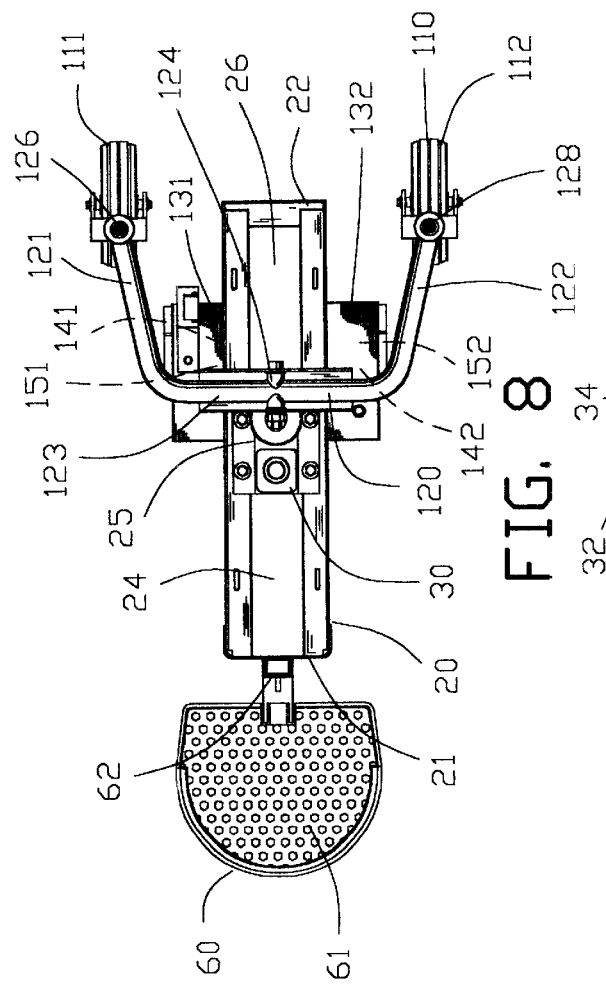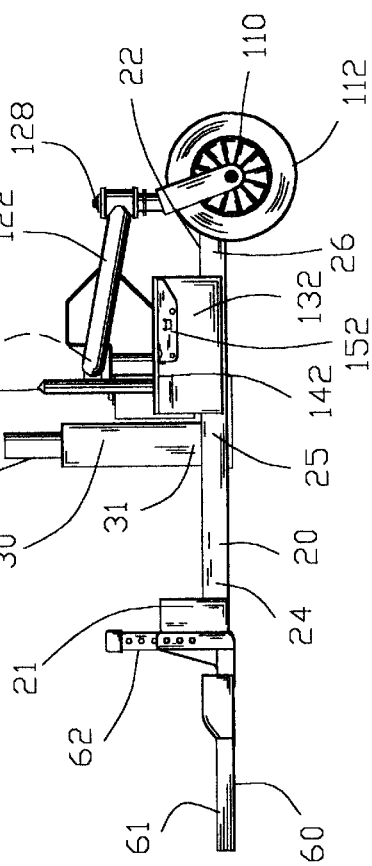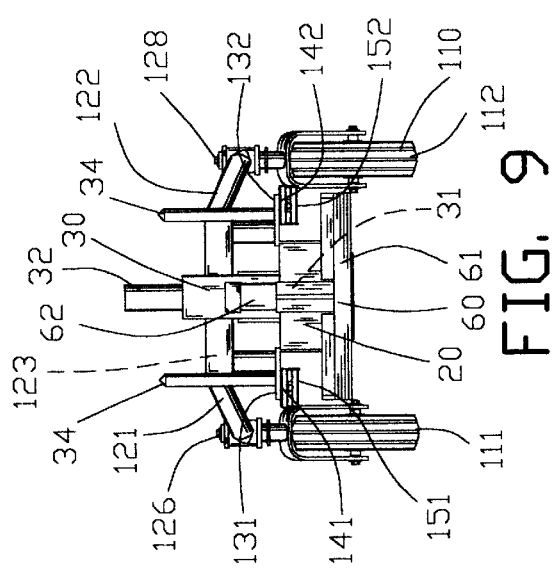

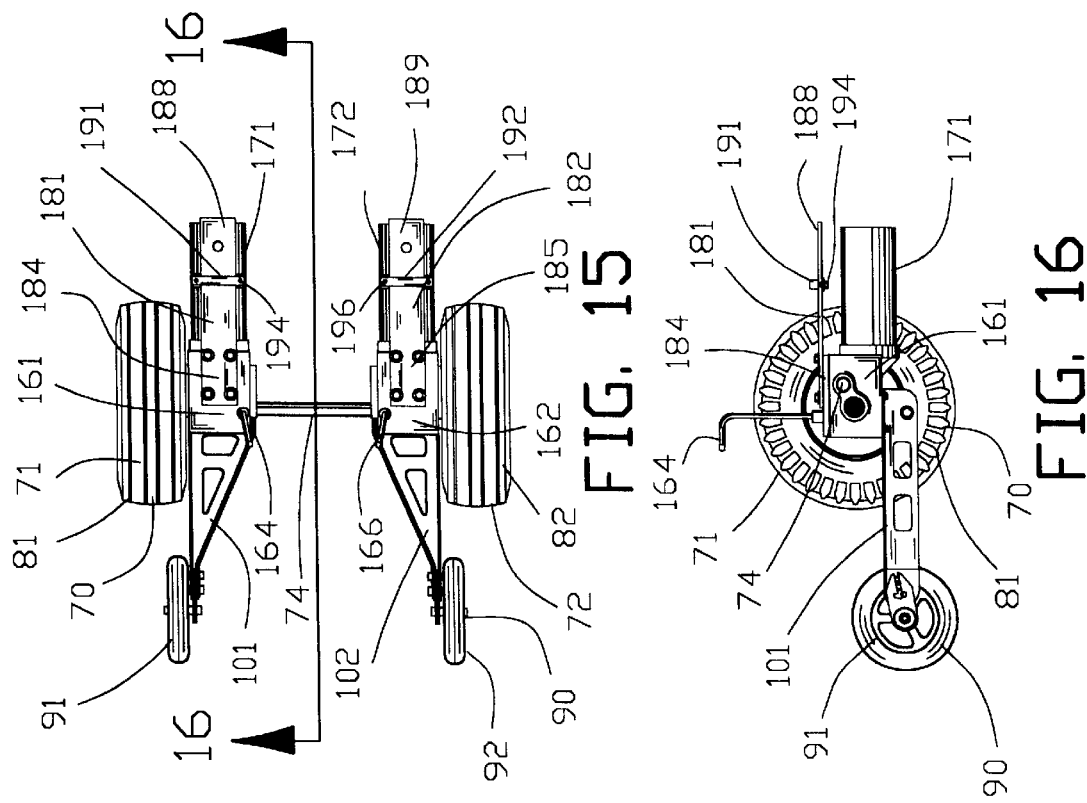

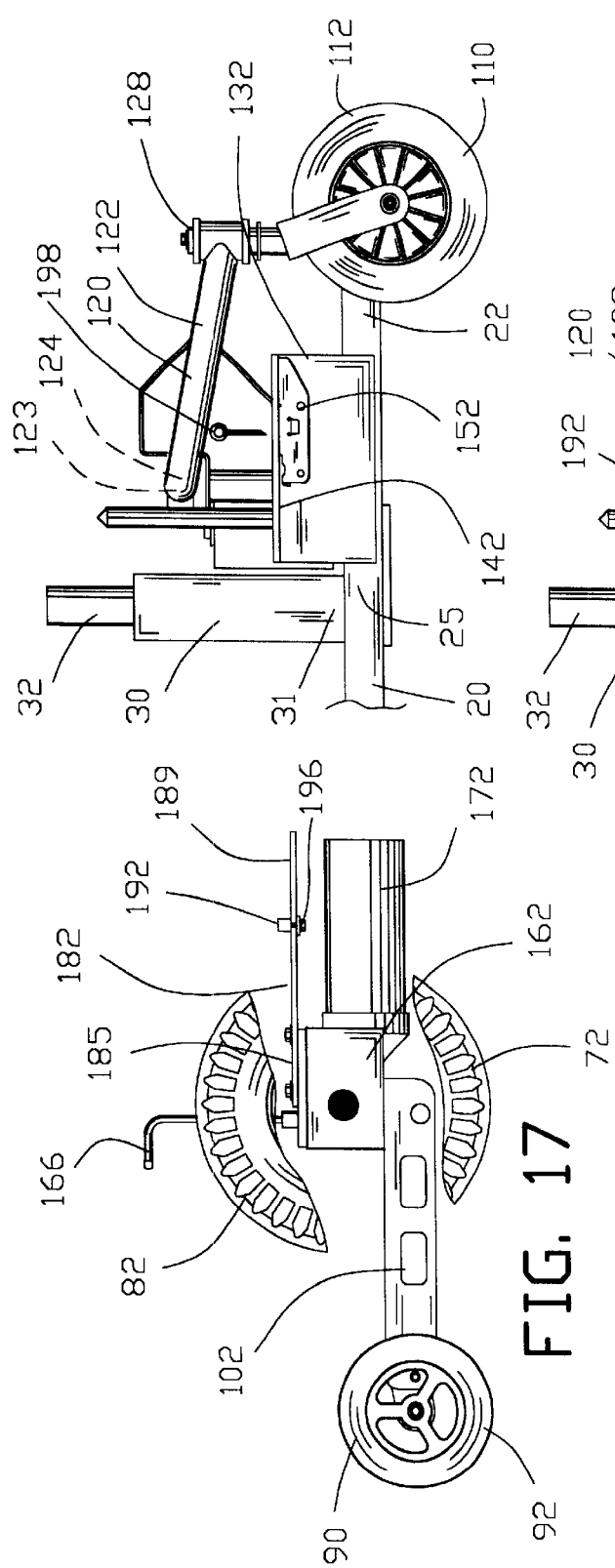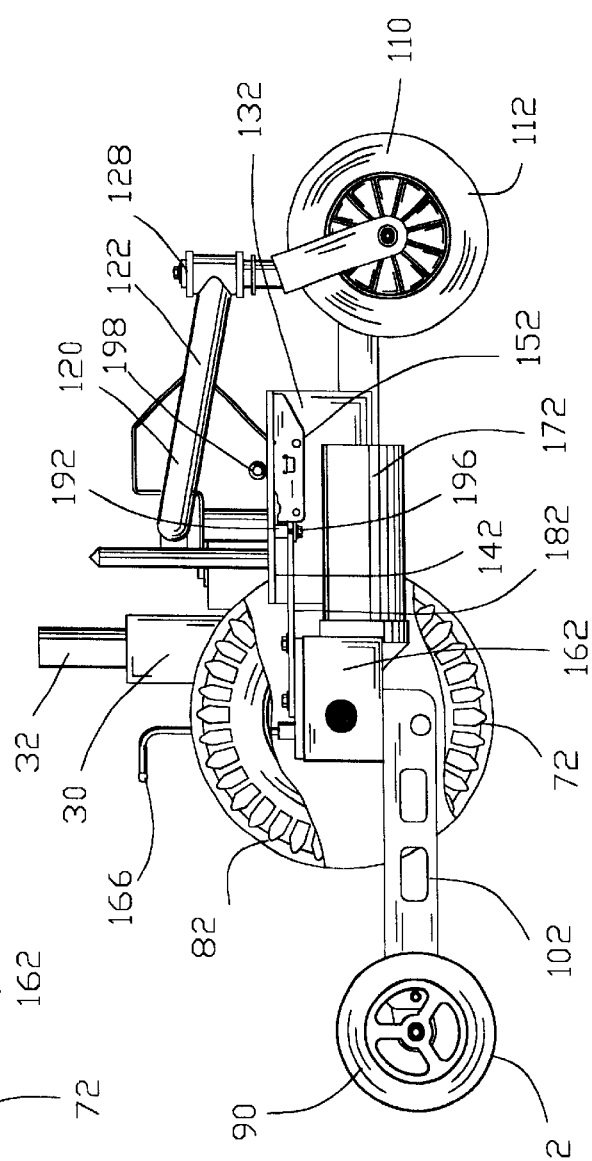
FIG. 17
FIG. 18

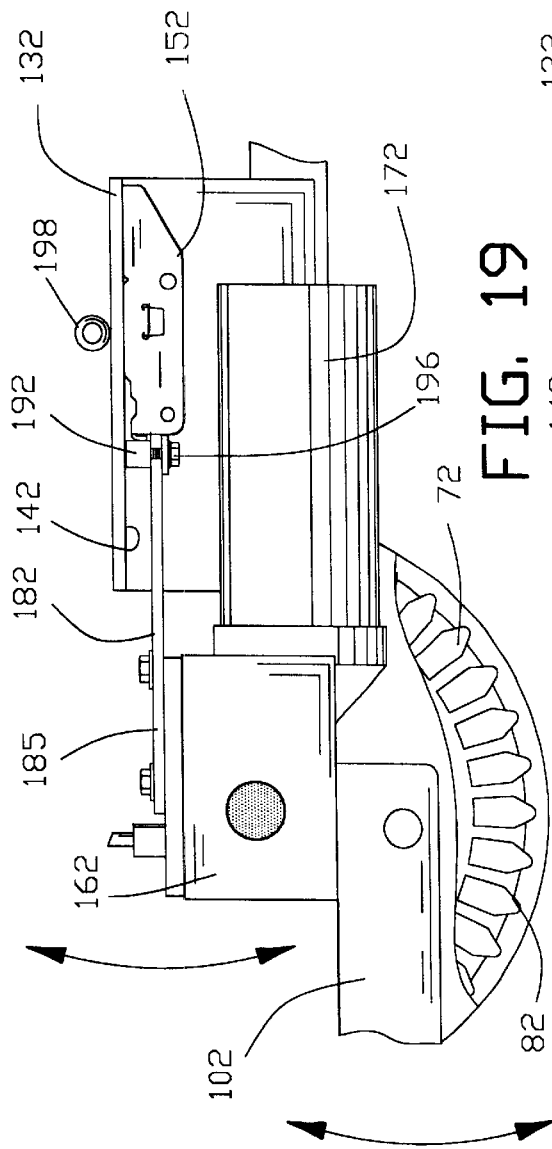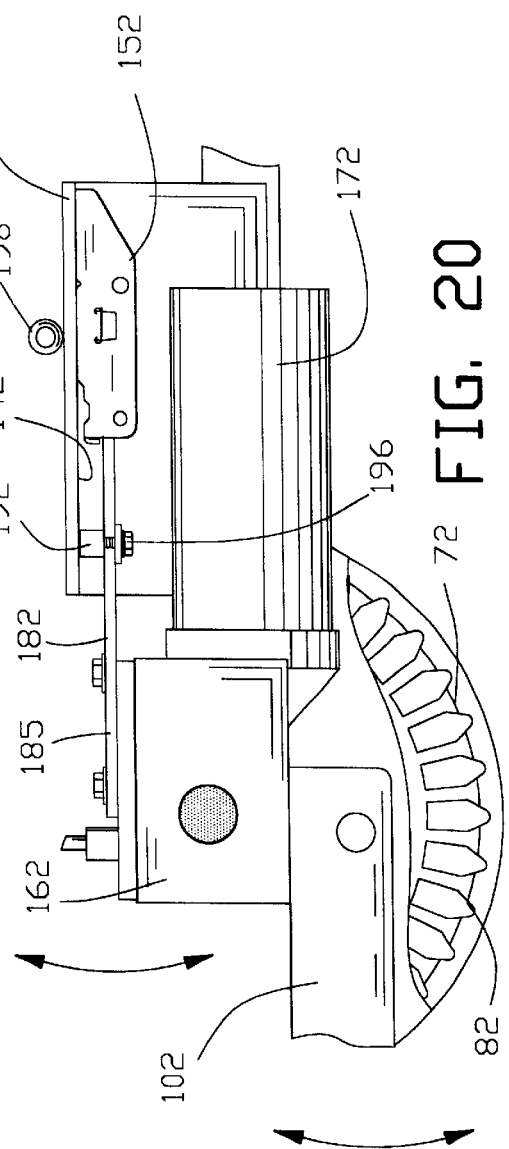

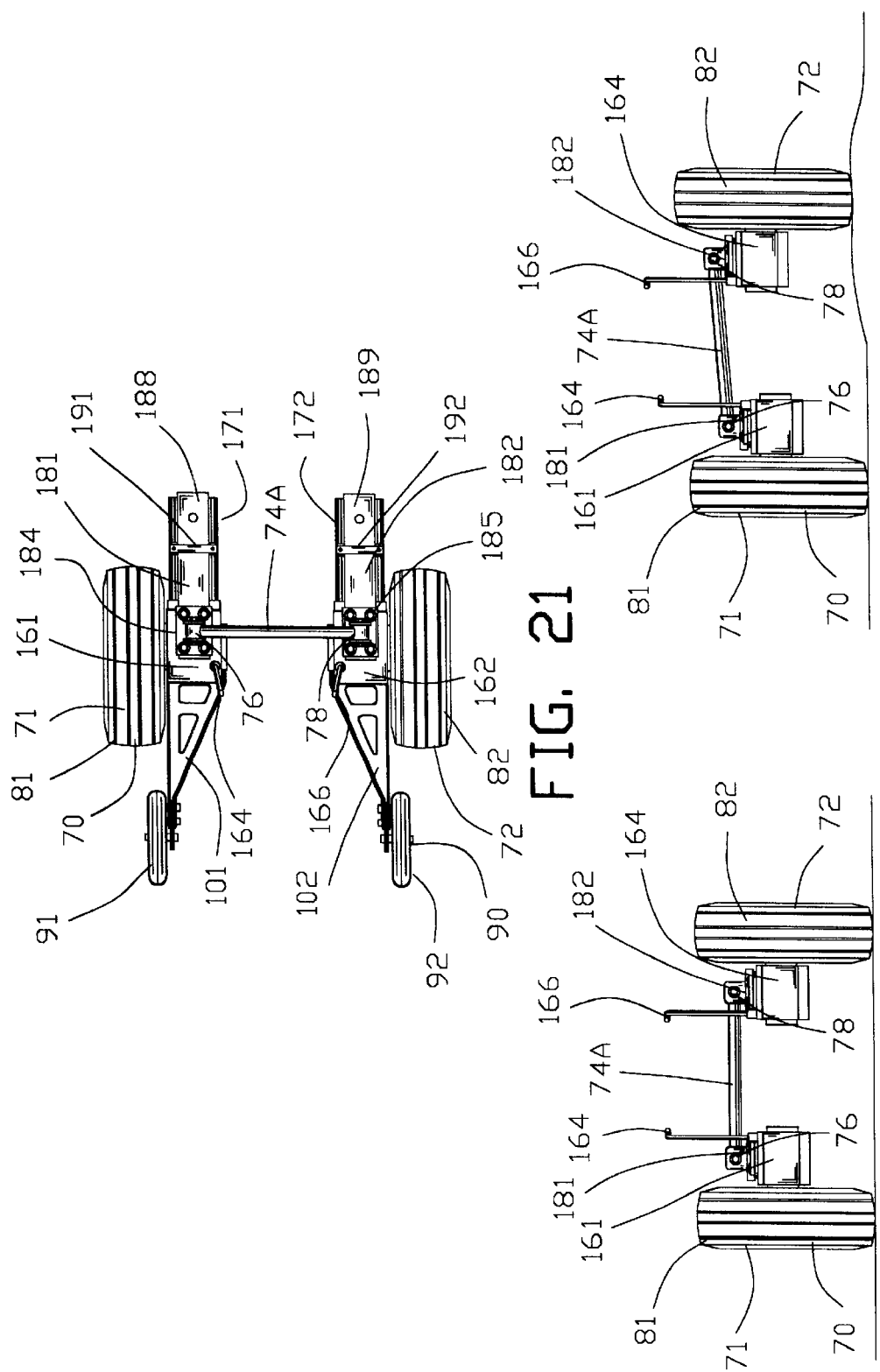

SUSPENSION FOR CENTRAL DRIVE VEHICLE

CROSS-REFERENCE TO RELATED APPLICATIONS

This application claims benefit of U.S. Provisional application Ser. No. 60/109,071 filed Nov. 18, 1998. All subject matter set forth in provisional application Ser. No. 60/109,071 is hereby incorporated by reference into the present application as if fully set forth herein.

BACKGROUND OF THE INVENTION

1. Field of the Invention

This invention relates to personal mobility vehicles and more particularly to an improved drive wheel suspension system for a central drive personal mobility vehicle.

2. Prior Art Statement

Persons with partial and total walking disabilities have traditionally relied upon wheelchairs for locomotion. Wheelchairs generally have relatively widely spaced wheels for lateral stability and to comfortably accommodate the occupant. Persons in wheelchairs can move with relative ease in places such as hospitals which are usually provided with extra wide doors and halls and inclined ramps between vertically displaced levels. However, private homes and work places are generally not planned specifically to accommodate wheelchairs.

While wheelchairs are generally resistant to lateral tipping, wheelchairs are often designed for tipping backwards so that an attendant pushing a patient in a wheelchair can tip the front wheels up to negotiate such obstacles as steps, thresholds, and the like. While such a configuration is useful when the wheelchair is pushed by an attendant, the design presents some hazards when the occupant of the wheelchair attempts to move the wheelchair up a ramp.

In order to overcome some of the problems associated with wheelchairs, the medical equipment industry has developed small personal mobility vehicles as an alternative to the conventional wheelchair. In general, rear wheel drive personal mobility vehicles have a pair of powered rear wheels and a steerable front wheel. The track of the powered rear wheels is generally narrower than a conventional wheelchair, while the wheel base is generally longer than a conventional wheelchair. The personal mobility vehicles are usually designed for a tight turning radius in order to be more maneuverable than a conventional wheelchair. Accordingly, rear wheel drive personal mobility vehicles may be used in places which are not specifically designed for conventional wheelchair use.

Among the most maneuverable personal mobility vehicles are central drive personal mobility vehicles. A central drive personal mobility vehicle has a right and a left drive wheel and a left and a right trailing wheel. The right and left drive wheels are located substantially below a seat of the central drive personal mobility vehicle enabling the central drive personal mobility vehicle to essentially turn around within the overall length of the central drive personal mobility vehicle.

Although the central drive personal mobility vehicles are the most maneuverable personal mobility vehicles, the central drive personal mobility vehicle have certain disadvantages over the rear wheel drive personal mobility vehicles.

Firstly, most operators perceive the central drive personal mobility vehicle to be less stable than the rear wheel drive personal mobility vehicle. This perceived instability of the central drive personal mobility vehicle by infirm or elderly operators limited the acceptance of the central drive personal mobility vehicle by the purchasing public.

Secondly, when the central drive personal mobility vehicle is decelerated, the central drive personal mobility vehicle tends to pitch forward about the right and left drive wheels. In order to increase stability and to reduce the pitch forward upon deceleration, the central drive personal mobility vehicles is provided with a left and a right leading wheel. The addition of the left and right leading wheels reduces but does not eliminate the above problems.

Thirdly, the central drive personal mobility vehicle is unable to adjust for different weight distributions of the different operators of the central drive personal mobility vehicle. The central drive personal mobility vehicle designed to provide stability for an operator with one weight distribution may be unstable for an operator with another weight distribution.

Many in the prior art have attempted to solve the above problems with varying degrees of success. The following United States Patents are representative of attempts of the prior art to eliminate the aforementioned problems and to provide a central drive personal mobility vehicle which satisfies the needs of the art.

U.S. Pat. No. 3,952,822 to Udden et al. discloses an electrically powered wheel-chair for indoor and outdoor use comprising a pair of rear main wheels which are non-pivotably connected with the framework of the chair. At least one of the wheels is driven by an electric motor. A steering wheel is rotatably connected with the framework of the wheelchair and is positioned in front of the main wheels. The steering wheel is asymmetrically located on one side of a longitudinal axis through the middle of the chair. A support wheel is positioned on the other side of the longitudinal axis relative to the steering wheel at such a level above a flat and horizontal ground surface that it will not touch this surface when the steering wheel directed straight ahead. The diameter of the support wheel is less than that of the steering wheel and the distance from the fore-most point of the steering wheel to a transverse axis through the centers of the main wheels is greater than the corresponding distance for the support wheel. To provide good stability the electric batteries are located in a case thus designed that the common center of gravity of the batteries will be located on the same side of the longitudinal axis of the chair as the steering wheel. The frame-work is equipped with two auxiliary support wheels on either side of the chair and rearwards the main wheels.

U.S. Pat. No. 3,953,054 to Udden et al. discloses a hand operated wheel-chair with a pair of main wheels rigidly connected with the framework of the chair, at least one of which is either motor or hand operated and at least one castor wheel being pivotally connected with the framework of the chair and at least one support wheel being rigidly connected with the framework. At least one castor wheel and support wheel are positioned on each side of a line extending between the support points of the main wheels and at a level above the ground surface to permit either the castor or the support wheels to be in contact with the ground surface depending on whether the vertical through the center of gravity is located on one or the other side of the line between the support points of the main wheels. The wheel-chair also comprises a seat, which is disposed substantially mid-way between the main wheels and is supported by a transverse portion of the framework extending between the main wheels and being provided with a seat support in the form of a central column, which includes spring members for the seat and means for adjusting the height of the seat.

U.S. Pat. No. 4,245,847 to Knott discloses a wheelchair suitable for invalids or geriatric patients has a chair or seat supported on independent forward and rearward castor frames pivotally connected together at a transverse axis to form a castor frame assembly. The chair is pivotally mounted on the forward and rearward castor frames so that in negotiating a step or other obstacle, the lifting movement of the occupant is divided into stages so that a pleasant or comfortable ride is obtained. The wheelchair may be folded into a collapsed condition with the chair itself located between the castor frames.

U.S. Pat. No. 4,310,167 to McLaurin discloses a center of gravity wheelchair with an articulated chassis front and rear caster wheels, in which the main wheels and front and rear caster wheels are arranged in a diamond pattern, and the main wheels and rear caster wheel are carried by a subframe to form a bogie system, with the seat and front caster wheel carried by a seat frame assembly articulated with respect to the subframe through a pivoted link arrangement, whereby the seat may be moved forward relative to the main wheels, with a spring and damper connected between the subframe and seat frame assembly to minimize the tendency for the front caster wheel to lift off the ground when the main wheels are strongly propelled and to provide a shock absorbing structure for traversing rough ground. The diamond pattern provided by the wheels prevents lateral drift of the wheel chair when traversing sloping surfaces, and the articulated frame permits easier curb climbing.

U.S. Pat. No. 4,513,832 to Engman discloses a maneuverable, motor-driven wheeled chassis including a chassis structure carrying two pairs of support wheels separated in the longitudinal direction of the chassis. Between the pairs of support wheels there is a pair of drive wheels. The chassis structure includes a first frame structure carrying a first pair of support wheels and the pair of drive wheels, and a second frame structure carrying the second pair of support wheels and vertically pivotably connected to the first frame structure. The wheeled chassis is primarily intended for use as a wheelchair.

U.S. Pat. No. 4,538,857 to Engman discloses a foot rest arrangement for wheelchairs including a telescopic strut structure with an outer and an inner strut axially displaceable inside the outer strut, and a foot rest attached to the free lower end of one strut while the opposing free upper end of the other strut is attached to the wheelchair frame or to the forward portion of the chair seat frame, so that the strut structure carries the foot rest at a distance from the chair seat, this distance being variable by raising and lowering the foot rest and/or chair seat. Latching means are also arranged to lock the struts relative each other, with the foot rest at a given distance from the chair seat.

U.S. Pat. No. 5,183,133 to Roy et al. discloses a motorized wheel assembly provided in which there is a seat for receiving the occupant attached to a vertical shaft with a single central wheel mounted at the bottom of the shaft for rotation about a horizontal axis transverse to the chair and defining a direction of forward movement of the wheel forwardly of the chair. On the chair and the shaft is carried a battery and control unit for supplying power to the drive motor of the wheel mounted on the hub of the wheel. An outrigger frame includes a sleeve slideable on the shaft and a plurality of arms extending outwardly from the sleeve each arm carrying a castor wheel to prevent toppling of the device. Steering is achieved by the feet of the user applied to the outrigger frame to rotate the chair and the drivewheel about a vertical axis. The motor in a hub design of the wheel is achieved by providing a cylindrical housing surrounding the motor with annular bearings on the outer peripheral surface of the housing carrying the rim of the wheel which directly surrounds the housing. An output shaft at one end of the housing drives the rim through a coupling extending around the housing.

U.S. Pat. No. 5,435,404 to Garin, III discloses a power chair which is highly maneuverable and has a high degree of usable power. It provides maximum weight distribution to the pair of driving wheels of the vehicle unit. It greatly enhances the stability and provides an overall operating envelope of greatly reduced size, allowing the use of the vehicle in confined areas. The vehicle has a pair of drive wheels rotatably about a common axis which is transverse to the forward direction of the travel of the vehicle, the drive wheels being powered by respective drive motors. The center of mass of the vehicle and passenger is substantially in the vertical plane of the axis of the drive wheels. This arrangement increases the amount of weight for traction. The alignment of the mass with the axis of the driving wheels maximizes the resistance of the vehicle to steering deviations caused by centrifugal force. Stability fore and aft is provided by castering wheels placed in front of and behind the driving wheels. The rear wheel caster is preferably attached to a vertical pivoting swing arm. The movement of this arm is controlled by a spring and shock absorber assembly. However, the raw caster may be mounted with a rigid arm. Generally, at least one of the supporting arms must be spring biased to insure that substantially all wheels of vehicle remain on the ground, and also for shock absorbing purposes.

U.S. Pat. No. 5,445,233 to Fernie et al. discloses a multi-directional motorized wheelchair having a seat portion and, a back portion, and having two drive wheels, each having a separate motor for driving one drive wheel forwardly or backwardly, independently of the other wheel, a drive wheel mounting beneath the seat, and controls for operating the wheels either simultaneously in the same direction, or one of them in one direction, or simultaneously in opposite directions, and, stabilizer wheels mounted beneath the seat, and extending outwardly from and around the drive wheels, to stabilize the chair.

U.S. Pat. No. 5,592,997 to Ball discloses a wheelchair basically designed for mobility impaired children ages 2–6. The wheelchair is especially designed to facilitate the child's access to all objects and activities that would normally be available to a non-disabled child. The chair includes a power base, including large front drive wheels and small rear casters, and a seat that is positioned directly over the drive wheels and that is readily detachable from the base. All components of the wheelchair arc positioned inboard of the side edges of the seat and inboard of the front edge of the seat so as to maximize, access to areas alongside of and in front of the wheelchair. The axis of rotation of the front drive wheels is generally vertically aligned with the trunk of the child positioned in the seat and the composite center of gravity of the child and wheelchair is positioned slightly behind the axis of rotation of the drive wheels so that the child can tilt the wheelchair forwardly about the axis of the front drive wheels by a simple forward rotation of the child's trunk. The wheelchair also includes a stowable footrest that readily retracts into the base of the wheelchair.

U.S. Pat. No. 5,690,185 to Sengel discloses a self powered variable direction wheeled task chair, and a personal mobility device, providing additional ranges of motion in that it has an electrically powered height adjustable seat allowing the operator's seating position to range from standard table height seating to work bench or counter top seating. Additionally and more importantly, the chair, will have directional movement capabilities well beyond typical wheel chairs, or other wheel driven personal mobility devices in that it will utilize electro-mechanical directionally pivoting propulsion, capable of not only forward, backward, and pivot turning capabilities, but also sideways movement or more precisely, movement in any direction, and a rotational movement as may be required by the operator.

U.S. Pat. No. 5,697,465 to Kruse discloses a personal mobility vehicle having a low center of gravity and compact overall size which facilitates travel in narrow hallways and in negotiating sharp turns both indoors and out of doors on smooth and uneven surfaces. The vehicle includes a generally horizontally disposed frame supported in close proximity above the ground by a pair of side-by-side space steerable rear wheels and two spaced motor-driven front wheels. A battery arrangement is connected to and supported by the frame and operably connected between a control lever in electrical communication with an electronic circuit and the motors for propelling the front wheels through a transaxle arrangement and for steering the rear wheel. By the side-by-side spaced fear wheel arrangement, steering angles of up to about 90 degrees are achieved without stalling propulsion. A seat is provided whereby a user's feet may be comfortably supported on the frame or separate removable or fixed foot rests. Outrigger type anti-scuff and anti-tip wheels are also provided and may be in combination with a forwardly positioned ramp assist wheel connected beneath a forwardly perimeter of the frame to assist the vehicle in travelling over a ramp or bump.

U.S. Pat. No. 5,944,131 to Schaffner et al. discloses a front wheel drive power wheel chair having the drive wheel axis of rotation forward of the wheelchair user's eyes and cranial center of perception.

Therefore it is an object of the present invention is to provide a central drive personal mobility vehicle which overcomes the aforementioned problems of the prior art and provide a significant advancement to the central drive personal mobility vehicle art.

Another object of the present invention is to provide a central drive personal mobility vehicle comprising an improved suspension system resulting in a superior stability for an operator.

Another object of the present invention is to provide a central drive personal mobility vehicle having an improved suspension system which reduces and/or substantially eliminates the jolting and abruptness encountered by operators of central drive personal mobility vehicles of the prior art.

Another object of the present invention is to provide a central drive personal mobility vehicle comprising an improved suspension system which substantially eliminates the pitch forward upon deceleration present in the central drive personal mobility vehicle of the prior art.

Another object of the present invention is to provide a central drive personal mobility vehicle comprising an improved suspension system which may be adjusted to accommodate for the weight distribution of the operator.

Another object of the present invention is to provide a central drive personal mobility vehicle comprising an improved suspension system which may be adjusted for either indoor operation on smooth surfaces or may be adjusted for outdoor operation on rough surfaces.

Another object of the present invention is to provide a central drive personal mobility vehicle having a superior ride and superior traction especially on inclined surfaces.

Another object of the present invention is to provide a central drive personal mobility vehicle having a pedestal for mounting a seat that is capable of accommodating a rotatable chair or a seat lift for assisting the operator in mounting and embarking from the central drive personal mobility vehicle.

Another object of the present invention is to provide a central drive personal mobility vehicle having a lightweight frame heretofore unknown in central drive personal mobility vehicles.

Another object of the present invention is to provide a central drive personal mobility vehicle which may be readily disassembled for transportation and shipping.

The foregoing has outlined some of the more pertinent objects of the present invention. These objects should be construed as being merely illustrative of some of the more prominent features and applications of the invention. Many other beneficial results can be obtained by applying the disclosed invention in a different manner or modifying the invention with in the scope of the invention. Accordingly other objects in a full understanding of the invention may be had by referring to the summary of the invention and the detailed description describing the preferred embodiment of the invention.

SUMMARY OF THE INVENTION

A specific embodiment of the present invention is shown in the attached drawings. For the purpose of summarizing the invention, the invention relates to an improved method and apparatus for a central drive personal mobility vehicle comprising a frame extending between a leading frame end and a trailing frame end thereby defining a leading frame portion, an intermediate frame portion and a trailing frame portion. The frame has a right and a left frame mounting located in the trailing frame portion of the frame. A seat is mounted to the intermediate portion of the frame.

The central drive personal mobility vehicle comprises a right and a left drive wheel assembly having a left and a right drive wheel. A right and a left leaf spring extends between a proximal end and a distal end. The proximal ends of the right and left leaf springs are secured to the right and left drive wheel assemblies, respectively. The distal ends of the right and left leaf springs are secured to the right and left frame mounting, respectively, for resiliently mounting the right and left drive wheel assemblies to the frame.

In a more specific embodiment of the invention, the leading frame portion and the trailing frame portion are adapted to receive a leading and a trailing battery. A pedestal extends substantially vertically upwardly from the intermediate frame portion of the frame with the seat being mounted to the pedestal.

In another embodiment of the invention, the right and left frame mounting include a right and a left socket for removably receiving the distal ends of the right and left leaf springs for removably securing the right and left drive wheel assemblies to the frame with the right and left drive wheels positioned substantially below the seat. Preferably, the right and left springs are adjustable for adjusting the effective stiffness of the right and left springs.

In another embodiment of the invention, the right and left drive wheel assembly comprise a right and a left gear box with a right and a left motor connected to the right and left gear box for driving the right and left drive wheels. The right and left leaf springs are secured to the right and left gear boxes and extend toward the trailing frame end of the frame. A linking bar interconnects the first and second gear boxes.

A right and a left leading wheel are rigidly secured to the right and left drive wheel assemblies and are located in proximity to the leading frame end of the frame. The right and left leaf springs simultaneously resiliently secure the right and left drive wheels and the right and left leading wheels relative to the frame.

A trailing wheel support is pivotably mounted to the intermediate frame portion of the frame. A right and a left trailing wheel are rotatably mounted to the trailing wheel support and are located in proximity to the trailing frame end of the frame.

The foregoing has outlined rather broadly the more pertinent and important features of the present invention in order that the detailed description that follows may be better understood so that the present contribution to the art can be more fully appreciated. Additional features of the invention will be described hereinafter which form the subject matter of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention.

BRIEF DESCRIPTION OF THE DRAWINGS

For a fuller understanding of the nature and objects of the invention, reference should be made to the following detailed description taken in connection with the accompanying drawings in which:

FIG. 1 is a side view of a central drive personal mobility vehicle incorporating the improved suspension system of the present invention;

FIG. 2 is a front view of FIG. 1;

FIG. 3 is a side view of a central drive personal mobility vehicle of FIG. 1 with a covering being removed;

FIG. 4 is a front view of FIG. 3;

FIG. 5 is a side view similar to FIG. 3 with a seat being removed;

FIG. 6 is a front view of FIG. 5;

FIG. 8 is a top view similar to FIG. 7 with the driving assemblies being removed;

FIG. 9 is a front view of FIG. 8;

FIG. 10 is a side view of FIG. 8;

FIG. 15 is a top view of FIG. 12;

FIG. 16 is a sectional view along line 16—16 in FIG. 15;

FIG. 17 is an enlarged exploded view of FIG. 5 illustrating the frame of FIG. 10 and the driving assembly of FIG. 11;

FIG. 18 is a view similar to FIG. 17 with the driving assembly being connected to the frame;

FIG. 19 is a magnified view of a portion of FIG. 18 with an adjustment block being in a first position;

FIG. 20 is a view similar to FIG. 19 with the adjustment block being in a second position;

FIG. 21 is a top view similar to FIG. 15 illustrating an alternate linking arrangement for independently suspending the drive wheels;

FIG. 22 is a front view of FIG. 21 on an even surface;

FIG. 23 is a front view similar to FIG. 22 on an uneven surface;

Similar reference characters refer to similar parts throughout the several Figures of the drawings.

DETAILED DISCUSSION

Figure 7:
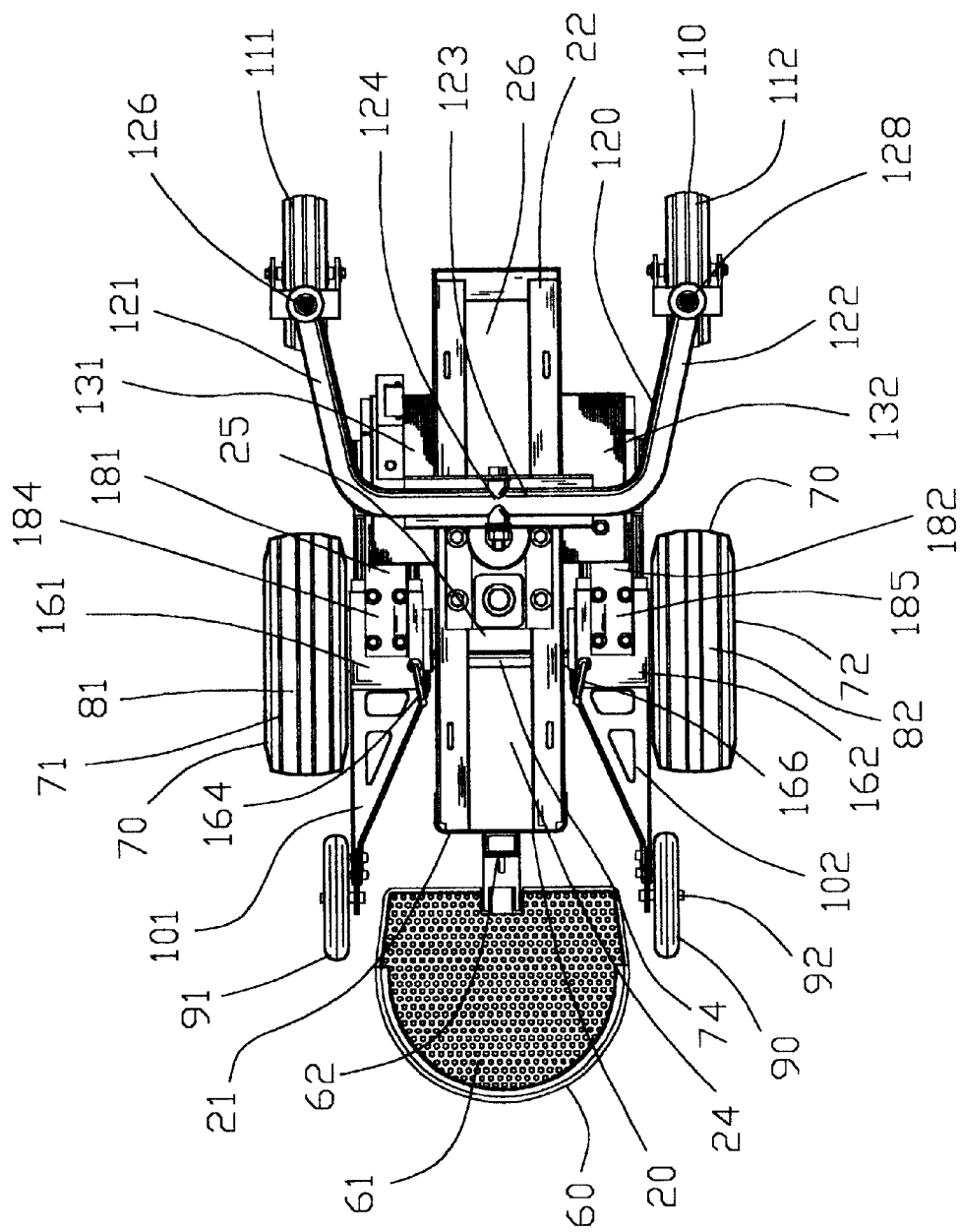
FIG. 7 is a top view of FIG. 5.
Figure 12:
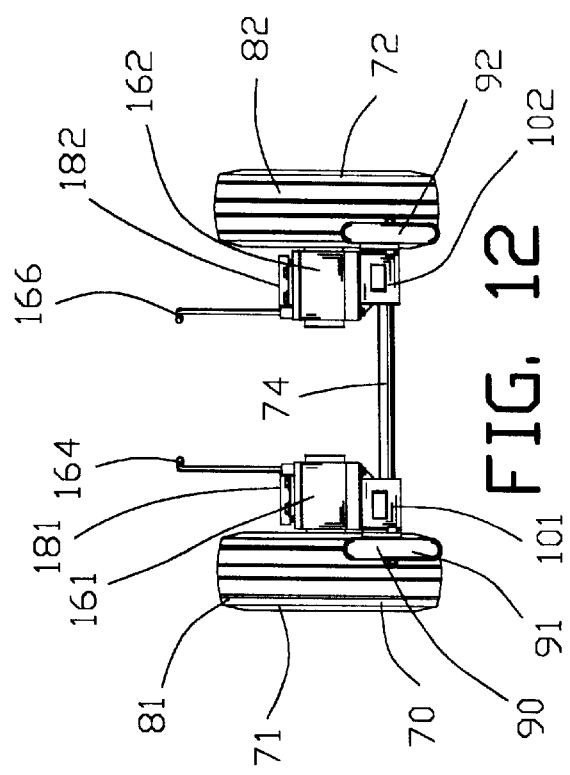
FIG. 12 is a front view of FIG. 11.

FIGS. 1 and 2 are side and front views of a central drive personal mobility vehicle 10 incorporating the improved suspension system of the present invention. The central drive personal mobility vehicle 10 comprises a frame 20 extending between a leading frame end 21 and a trailing frame end 22. The frame 20 defines a leading frame portion 24, an intermediate frame portion 25 and a trailing frame portion 26.

The frame 20 of the central drive personal mobility vehicle 10 is covered by a covering 28 for overlaying interior portions of the central drive personal mobility vehicle 10 and for enhancing the attractiveness of the personal mobility vehicle 10.

A pedestal 30 extends between a lower end 31 and an upper end 32 in a substantially vertical orientation. The lower end 31 of the pedestal 30 is secured to the intermediate frame portion 25 of the frame 20. An upper end 32 of the pedestal 30 extends upwardly for supporting a seat 40.

An optional seat locking mechanism comprises plural pins 34 extending upwardly from the frame 20 for cooperation with plural tubes 36 extending downwardly from the seat assembly 40. The plural pins 34 are received within the plural tubes 36 in a telescopic arrangement as the seat assembly 40 is placed upon the pedestal 30. The plural pins 34 and plural tubes 36 in combination with the pedestal 30 provides a three point support for the seat assembly 40.

The seat assembly 40 comprises a seat portion 41 and a back portion 42. In this example, the back portion 42 is pivotally mounted to the seat portion 41 by a pivot 44 for accommodating for the size and comfort of the operator (not shown). A seat cushion 46 is disposed on the seat portion 41 whereas a back cushion 48 is disposed on the back portion 42.

The seat assembly 40 may be rotatably mounted on the pedestal 30 with the rotation of the seat assembly 40 being controlled by a lever 49. The rotation of the seat assembly 40 further facilitates the ingress and egress of an operator from the central drive personal mobility vehicle 10. The seat assembly 40 may include a chair lift (not shown) for further assisting the ingress and egress of an operator from the central drive personal mobility vehicle 10.

The seat assembly 40 comprises a right and a left armrest 51 and 52 secured to the seat portion 41 of the seat assembly. One of the right and left armrests 51 and 52 supports a control console 54 for controlling the central drive personal mobility vehicle 10. Preferably, the control console 54 includes a joy stick 56 for controlling the speed and direction of the central drive personal mobility vehicle 10.

FIGS. 3 and 4 are side and front views of the central drive personal mobility vehicle 10 of FIGS. 1 and 2 with the covering 28 removed from the frame 20. A foot rest assembly 60 comprises; a foot rest 61 and a foot rest mounting 62. The foot rest mounting 62 is secured to the leading frame portion 24 of the frame for adjustably supporting the foot rest 61. Preferably, the foot rest mounting 62 adjusts the height and angle of the foot rest 61 to the comfort of the operator. The foot rest 61 may be removed from the foot rest mounting 62 for transporting the central drive personal mobility vehicle 10.

FIGS. 5–7 illustrate side, end and top views of the central drive personal mobility vehicle 10 with the seat assembly 40 being removed from the frame 20. A drive wheel assembly 70 comprises a right and a left drive wheel assembly 71 and 72 including a right and a left drive wheel 81 and 82 located substantially below the seat assembly 40. The right and left drive wheel assemblies 71 and 72 are interconnected by a rigid linking bar 74. The rigid linking maintains the right and left drive wheels 81 and 82 in a fixed spatial relationship. The right and left drive wheels 81 and 82 are individually driven for enabling the operator to control the speed and direction of the central drive personal mobility vehicle 10 through the joy stick 56. The drive wheel assembly 70 will be described in greater detail hereinafter.

A leading wheel assembly 90 comprises a right and a left leading wheel 91 and 92. The right and left drive wheel assemblies 71 and 72 are secured by a right and a left leading wheel support 101 and 102 to the right and left leading wheels 91 and 92 to be located in proximity to the leading frame end 21 of the frame 20. The leading wheel assembly 90 will be described in greater detail hereinafter.

A trailing wheel assembly 110 comprises a right and a left trailing wheel 111 and 112. A trailing wheel support 120 has a right and a left terminal end 121 and 122 interconnected by a central region 123 forming a generally U-shaped trailing wheel support 120. The central region 123 of the trailing wheel support 120 is pivotally mounted to the intermediate frame portion 25 of the frame by a pivot 124.

The right and left trailing wheels 111 and 112 are shown as a right and a left caster 111 and 112. The right and left trailing wheels 111 and 112 are rotatably mounted by swivels 126 and 128 to the right and left terminal ends 121 and 122 of the trailing wheel support 120. The right and left trailing wheels 111 and 112 are located in proximity to the trailing frame end 22 of the frame 20.

FIGS. 7–10 illustrate the intermediate frame portion 25 supporting the first end 31 of the pedestal 30. The position of the pedestal 30 within the intermediate frame portion 25 enables a leading and a trailing battery (not shown) to be placed within the leading frame portion 24 and the trailing frame portion 26 of the frame 20.

The frame 20 includes a right and a left frame mounting 131 and 132 located on the trailing frame portion 26 of the frame 20. The right and left frame mountings 131 and 132 define a right and a left frame surface 141 and 142. A right and a left socket 151 and 152 are mounted to the right and left frame mountings 131 and 132 to be located adjacent to the right and left frame surfaces 141 and 142. The function of the frame mountings 131 and 132, the frame surfaces 141 and 142 and the sockets 151 and 152 will be described in greater detail hereinafter.

FIGS. 11–16 are various views of the drive wheel assembly 70 removed from the frame 20 shown in FIGS. 1–7. The right and left drive wheels 81 and 82 are connected to a right and a left gear box 161 and 162 powered by a right and a left motor 171 and 172. The right and left drive wheels 81 and 82 are individually driven by the right and left motors 171 and 172 to control the speed and direction of the central drive personal mobility vehicle 10 through the joy stick 56. A right and a left lever 164 and 166 extend from the right and left gear boxes 161 and 162 for disengaging the right and left drive wheels 81 and 82 from the right and left motors 171 and 172 to allow free movement of the central drive personal mobility vehicle 10.

A right and a left leaf spring 181 and 182 are connected respectively to the right and left gear boxes 161 and 162. The right and left leaf springs 181 and 182 define proximal ends 184 and 185 and distal ends 188 and 189, respectively. The proximal ends 184 and 185 of the right and left leaf springs 181 and 182 are secured to the right and left gear boxes 161 and 162 for extending toward the trailing frame end 22 of the frame 20.

A right and a left adjustment block 191 and 192 are movably secured to the right and left leaf springs 181 and 182. When the right and left adjustment blocks 191 and 192 are properly located on the right and left leaf springs 181 and 182, the right and left adjustment blocks 191 and 192 are secured in position on the right and left leaf springs 181 and 182 by mechanical fasteners 194 and 196. The right and left adjustment blocks 191 and 192 adjust the effective stiffness of the right and left leaf springs 181 and 182 as will be described in greater detail hereinafter.

The right and left leading wheel supports 101 and 102 extend from the right and left gear boxes 161 and 162 for rigidly mounting the right and left leading wheels 91 and 92 relative to the right and left drive wheels 81 and 82. The right and left leading wheel supports 101 and 102 position the right and left leading wheels 91 and 92 in proximity to the leading frame end 21 of the frame 20.

In an alternative arrangement, the right and left leading wheels 91 and 92 may be mounted resiliently on leaf springs (not shown). In this arrangement, the rigid supports 101 and 102 are replaced by resilient leaf springs (not shown). In still a further arrangement, the right and left leaf springs 181 and 182 may be extended forward of the right and left gearboxes 161 and 162 for resiliently supporting the right and left leading wheels 91 and 92.

Figure 14:
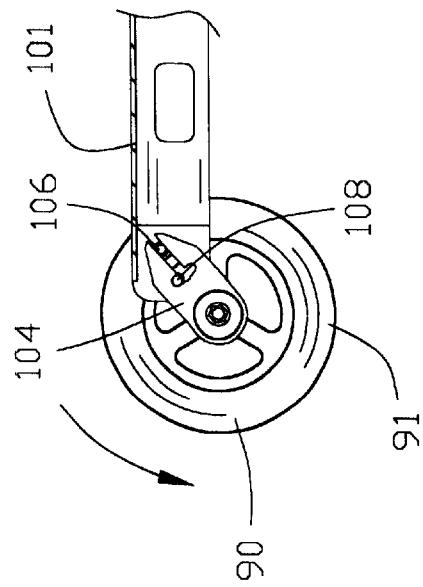
FIG. 14 a magnified view of a portion of FIG. 11 illustrating the leading wheel in a second adjusted position.
Figure 13:
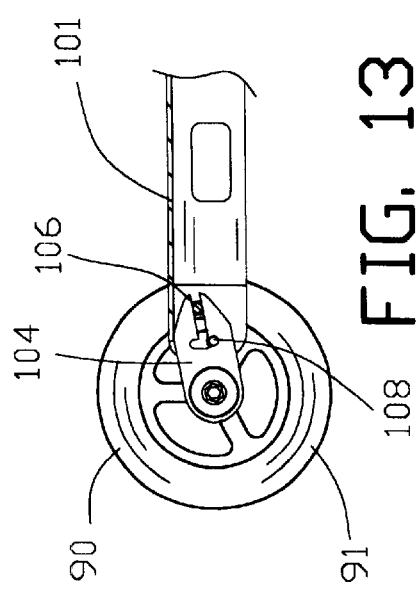
FIG. 13 is a magnified view of a portion of FIG. 11 illustrating the leading wheel in a first adjusted position.

FIGS. 13 and 14 are magnified views of a portion of FIG. 16 illustrating the right leading wheel 91 in a first and a second adjusted position. The right leading wheel 91 is rotatably mounted to a pivot arm 104. The pivot arm 104 is pivotably mounted to the right leading wheel support 101 by a pivot 106. A mechanical fastener 108 secures the pivot arm 104 in the proper pivotable position on the right leading wheel support 101. The pivot arm 104 adjusts the ground clearance of the right leading wheel 91. The left leading wheel 92 is pivotably mounted to the left leading wheel support 102 in a similar fashion.

A minimal ground clearance of the right and left leading wheels 91 and 92 is required for enabling rotation of the central drive personal mobility vehicle 10 about the right and left drive wheels 81 and 82. A minimal ground clearance reduces the undesirable pitch forward upon deceleration of the central drive personal mobility vehicle 10. However, a minimal ground clearance inhibits operation of the central drive personal mobility vehicle 10 in an outdoor environment or on rough terrain.

Preferably, the right and left leading wheels 91 and 92 have a ground clearance between 0.25 inches and 1.5 inches when the central drive personal mobility vehicle 10 is located on a level surface. For operation within an indoor environment or a smooth terrain which is void of barriers such as inclines, bumps and small curbs, a ground clearance of 0.25 inches is desirable for the leading wheels 91 and 92. For operation within an outdoor environment or rough terrain having barriers such as inclines, bumps and small curbs, a ground clearance of 1.50 inches is desirable for the leading wheels 91 and 92.

Figure 11:
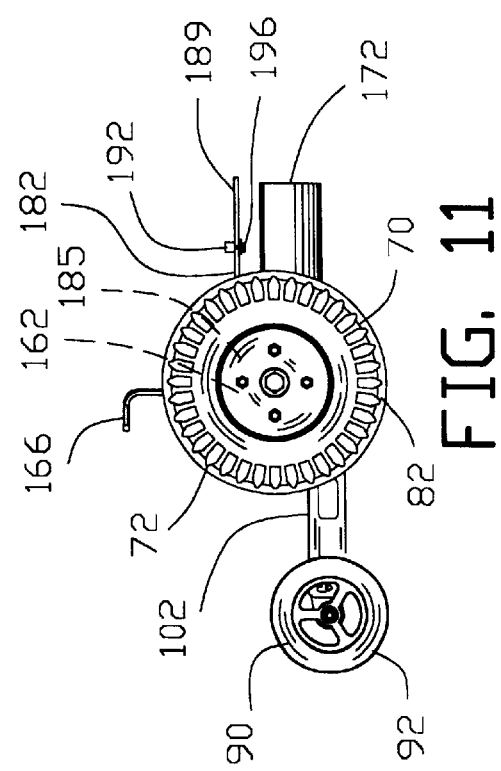
FIG. 11 is a side view of the driving assemblies of FIG. 5.

FIG. 17 is an enlarged exploded view of FIG. 5 illustrating the frame 20 of FIG. 10 and the driving assembly 72 of FIG. 11. The driving assembly 72 is located relative to the frame 20 to position the distal end 189 of the left leaf spring 182 adjacent to the left socket 152 of the left frame mounting 132.

FIG. 18 is a view similar to FIG. 17 with the driving assembly 72 being connected to the frame 20. The distal end 189 of the left leaf spring 182 is received by the left socket 152 of the left frame mounting 132. A locking pin 198 extends through apertures within the left leaf spring 182 and the left socket 152 for securing the left leaf spring 182 within the left socket 152. The right leaf spring 181 is secured to the right socket 151 in a similar manner.

The right and left leaf springs 181 and 182 resiliently mount the right and left drive wheels 81 and 82 relative to the frame 20 to be located below the seat 40. Since the right and left leading wheels 91 and 92 are rigidly secured to the right and left drive wheel assemblies 71 and 72, the right and left leaf springs 181 and 182 resiliently suspend the right and left leading wheels 91 and 92 relative to the frame 20. The right and left leaf springs 181 and 182 simultaneously resiliently suspend the right and left drive wheels 81 and 82 as well as the right and left leading wheels 91 and 92.

FIGS. 19 and 20 are magnified views of a portion of FIG. 18 illustrating the left adjustment block 192. The right and left adjustment blocks 191 and 192 are interposed between the right and left frame surfaces 141 and 142 and the right and left leaf springs 181 and 182, respectively. The right and left adjustment blocks 191 and 192 are movable along the right and left leaf spring 181 and 182 for adjusting the effective stiffness of the right and left leaf springs 181 and 182. The right and left adjustment blocks 191 and 192 are secured in position on the right and left leaf springs 181 and 182 by mechanical fasteners 194 and 196.

FIG. 19 illustrates the left adjustment block 192 being in a first position located adjacent to the left socket 152. When the left adjustment block 192 is in this position, the left leaf spring 182 pivots about the left adjustment block 192 to resiliently suspend the left drive wheel 82.

FIG. 20 illustrates the left adjustment block 192 being in a second position located remote from the left socket 152. When the left adjustment block 192 is in this position, the left leaf spring 182 pivots about the left adjustment block 192 to resiliently suspend the left drive wheel 82.

The movement of the left adjustment block 192 adjusts the effective length of the left leaf spring 182. The effective length of the left leaf spring 182 is the distance between the left gearbox 162 and the left adjustment block 192. Since the effective length of the left leaf spring 182 is smaller in FIG. 20 relative to FIG. 19, the left leaf spring 182 in FIG. 20 is stiffer relative to the left leaf spring 182 in FIG. 19 as indicated by the relative magnitude of the arrows. The adjustment of the right and left leaf springs 181 and 182 enable the central drive personal mobility vehicle 10 of the present invention to be customized for the weight distribution of the operator.

FIG. 21 is a top view similar to FIG. 15 illustrating an alternate suspension arrangement for the right and left drive wheels 81 and 82. The right and left drive wheel assemblies 71 and 72 include a right and a left pivot 76 and 78 for pivotably mounting opposed ends of a linking bar 74A between the right and left drive wheel assemblies 71 and 72.

FIG. 22 is a front view of FIG. 21 of the central drive personal mobility vehicle 10 on an even surface. The right drive wheel 81 is located at the same level as the left drive wheel 82 on the even surface in a manner similar to FIG. 12. The right and left drive wheels 81 and 82 are disposed in a parallel relationship.

FIG. 23 is a front view similar to FIG. 22 of the central drive personal mobility vehicle 10 located on an uneven surface. The right drive wheel 81 is located below the left drive wheel 82 on the uneven surface. The pivotable linking bar 74A between the right and left drive wheel assemblies 71 and 72 enables each of the right and left wheels 81 and 82 to move independently to simultaneously maintain contact with an uneven surface.

A second linking bar (not shown) may be pivotably mounted between and the right and left drive wheel assemblies 71 and 72. The second linking bar (not shown) cooperates with the linking bar 74A to maintain the right and left drive wheels 81 and 82 in a parallel relationship on an uneven surface.

Figure 24:
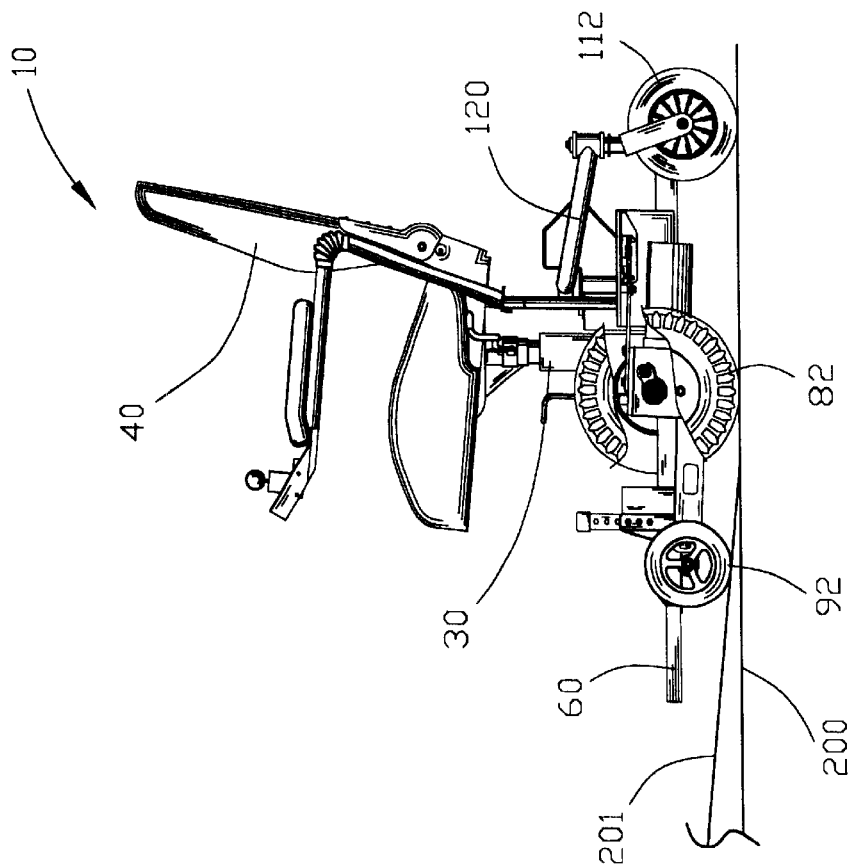
FIG. 24 is a side view of the central drive personal mobility vehicle of the present invention of FIG. 1 on a level surface.

FIG. 24 is a side view of the central drive personal mobility vehicle 10 of the present invention of FIG. 1 on a level ground surface 200. The right and left drive wheels 81 and 82 as well as the right and left trailing wheels 111 and 112 are in contact with the ground surface 200. The right and left leading wheels 91 and 92 are suspended above the ground having a preestablished ground clearance as heretofore described.

Figure 25:
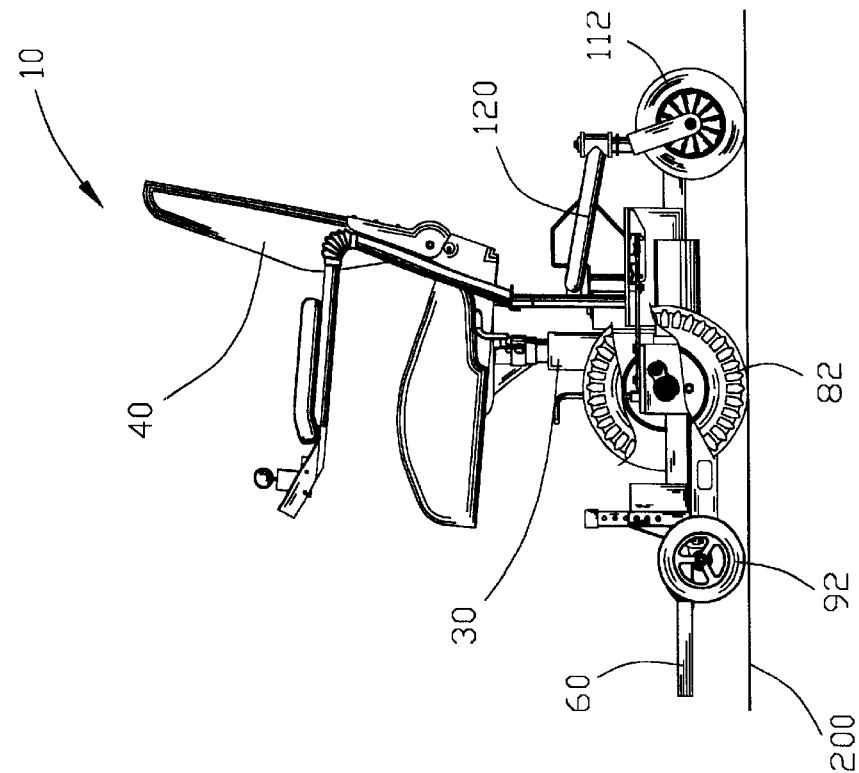
FIG. 25 is a side view similar to FIG. 24 with the personal mobility vehicle of the present invention initially climbing an inclined surface.

FIG. 25 is a side view similar to FIG. 24 with the central drive personal mobility vehicle 10 of the present invention initially climbing an inclined surface 201. The inclined surface 201 reduces the ground clearance of right and left leading wheels 91 and 92. The right and left leading wheels 91 and 92 are shown in contact with the inclined surface 201.

Figure 26:
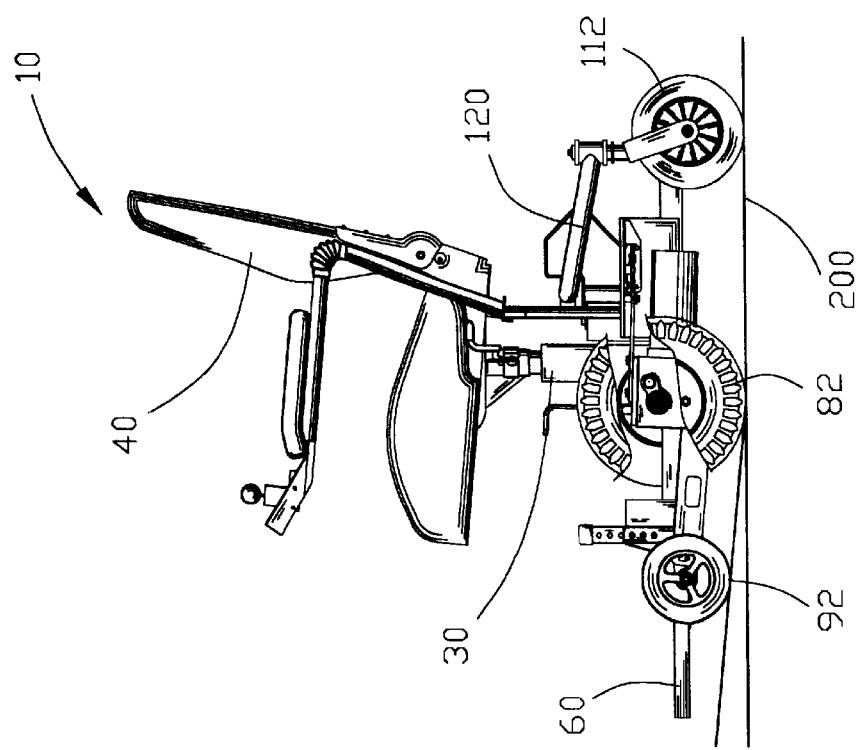
FIG. 26 is a side view similar to FIG. 25 with the personal mobility vehicle of the present invention further climbing the inclined surface.

FIG. 26 is a side view similar to FIG. 25 with the central drive personal mobility vehicle 10 of the present invention further climbing the inclined surface 201. The right and left leading wheels 91 and 92 are resiliently mounted by right and left leaf springs 181 and 182 through the resilient suspension of the left and right drive wheels 81 and 82. The right and left leading wheels 91 and 92 and the left and right drive wheels 81 and 82 rotate clockwise about the right and left leaf springs 181 and 182 to insure the left and right drive wheels 81 and 82 maintain contact with the ground surface 200 when the right and left leading wheels 91 and 92 ascend the inclined surface 201.

Figure 27:
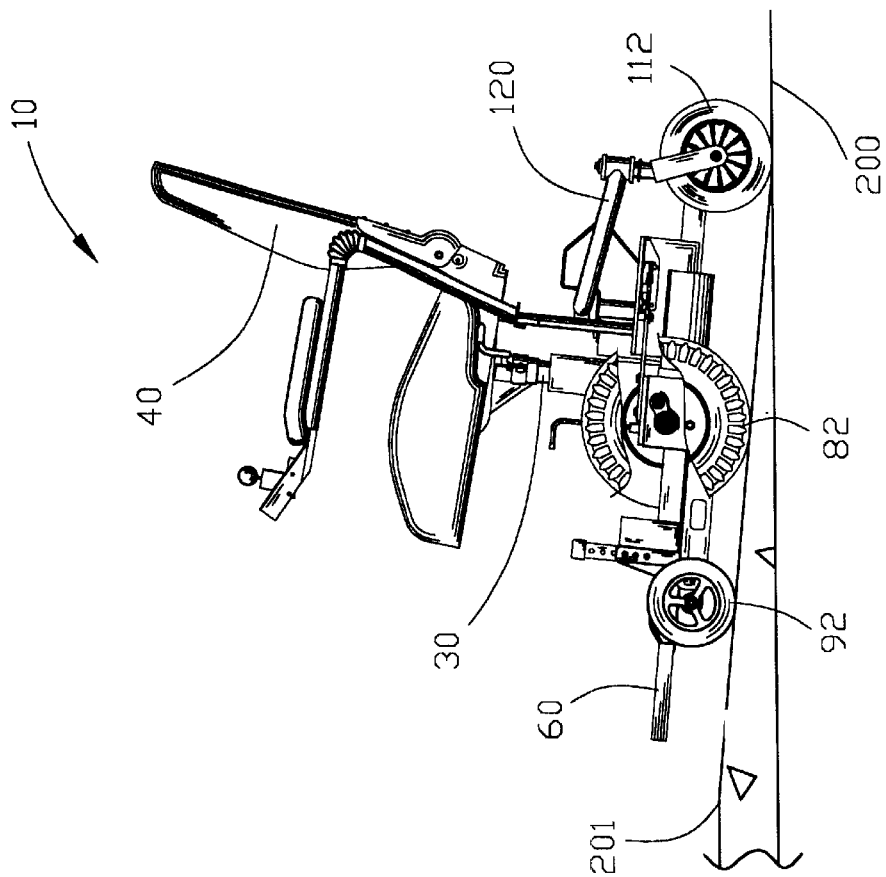
FIG. 27 is a side view similar to FIG. 26 with the personal mobility vehicle of the present invention completing the climbing the inclined surface.

FIG. 27 is a side view similar to FIG. 26 with the central drive personal mobility vehicle 10 of the present invention completing the climbing the inclined surface 201. The right and left leading wheels 91 and 92 and the left and right drive wheels 81 and 82 rotate counter clockwise about the right and left leaf springs 181 and 182 maintain the left and right drive wheels 81 and 82 and the right and left leading wheels 91 and 92 in contact with the inclined surface 201.

Figures 28, 29:
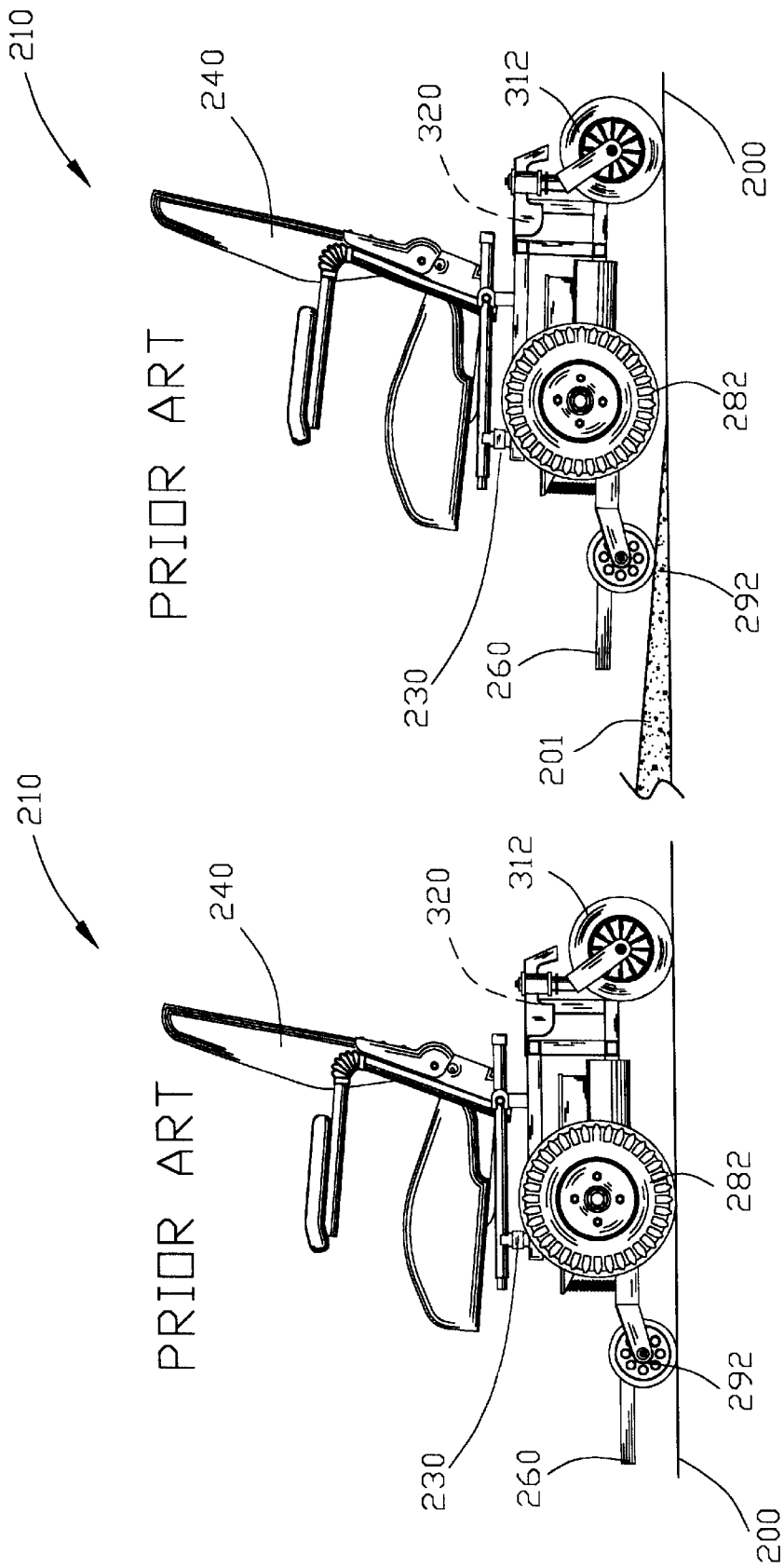
FIG. 28 is a side view of the personal mobility vehicle of the prior art on a level surface.
FIG. 29 is a side view similar to FIG. 28 with the personal mobility vehicle of the prior art initially climbing an inclined surface.

FIG. 28 is a side view of the personal mobility vehicle 210 of the prior art on the level ground surface 200. The right and left drive wheels 282 and the right and left trailing wheels 312 are in contact with the ground surface 200. The right and left leading wheels 292 are suspended above the ground.

FIG. 29 is a side view similar to FIG. 25 with the personal mobility vehicle 210 of the prior art initially climbing an inclined surface 201. The drive wheels 282 below the seat 240 have lost traction with the ground surface 200. The loss of traction of the drive wheels 282 is due to the stiffness of the suspension of the right and left leading wheels 292. The stiffness of the suspension of the right and left leading wheels 292 is employed to reduce the pitch forward upon deceleration of the prior art central drive personal mobility vehicle 210.

Figure 30:
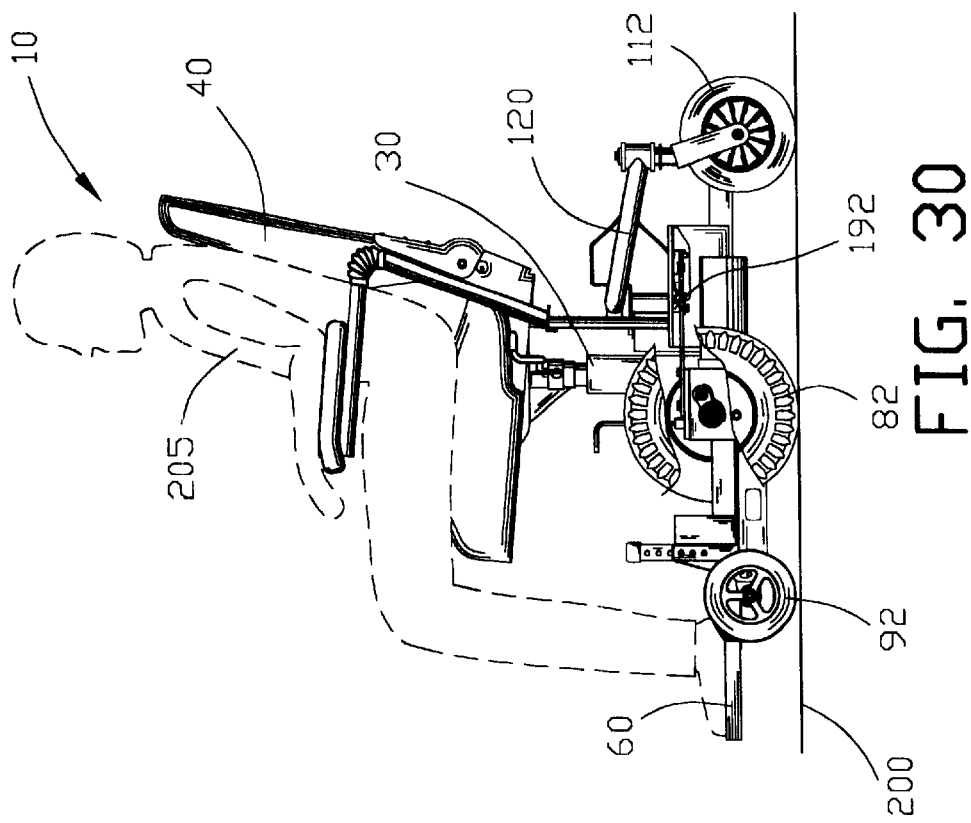
FIG. 30 is a side view of the central drive personal mobility vehicle of the present invention of FIG. 1 on a level surface with an operator having a first weight distribution.

FIG. 30 is a side view of the central drive personal mobility vehicle 10 of the present invention of FIG. 1 on a level surface 200 with an operator 205 having a first weight distribution. The center of mass of the operator 205 is located above or slightly to the right of the pedestal 30. The right and left adjustment blocks 191 and 192 are shown in the first position as shown in FIG. 19. The ground clearance of the right and left leading wheels 91 and 92 are established by the pivot arm 104 shown in FIGS. 13 and 14.

Figure 31:
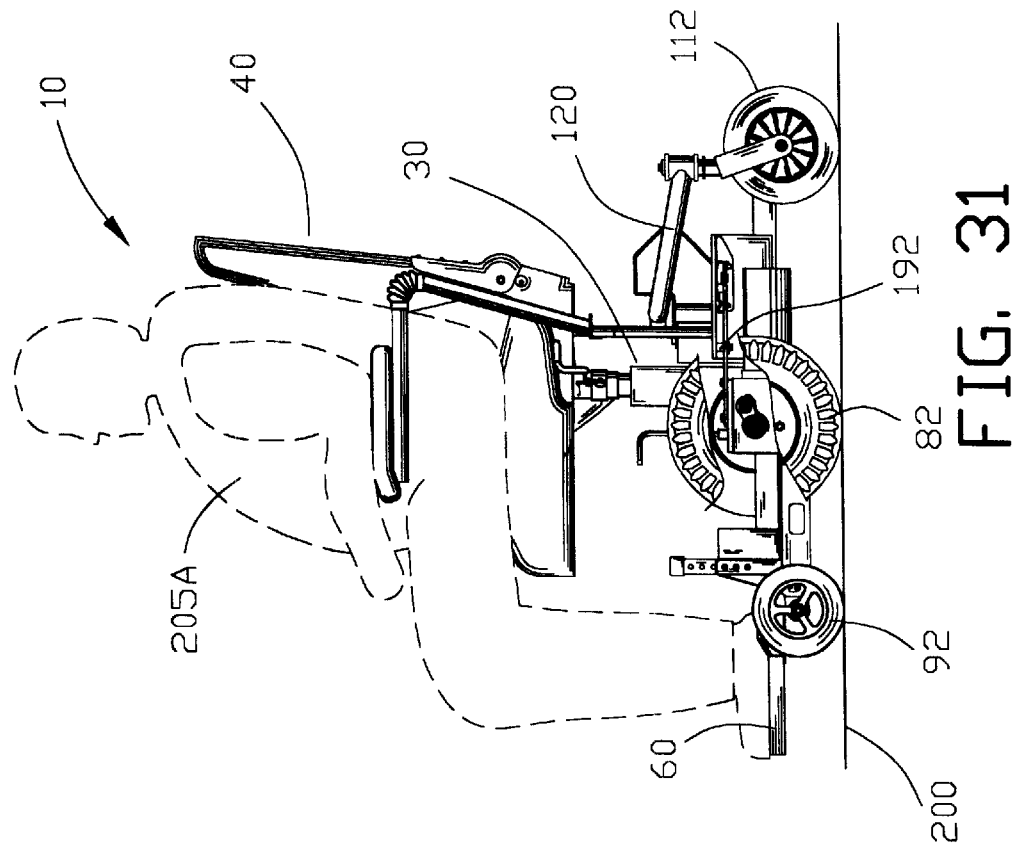
FIG. 31 is a side view of the central drive personal mobility vehicle of the present invention of FIG. 1 on a level surface with an operator having a second weight distribution.

FIG. 31 is a side view of the central drive personal mobility vehicle 10 of the present invention of FIG. 1 on a level surface 200 with an operator 205A having a second weight distribution. The center of mass of the operator 205A is located to the left of the pedestal 30. The right and left adjustment blocks 191 and 192 are shown in the second position as shown in FIG. 20 to provide a stiffer suspension for the different weight distribution. The ground clearance of the right and left leading wheels 91 and 92 are established by the pivot arm 104 shown in FIGS. 13 and 14.

The central drive personal mobility vehicle 10 allows for the customization of the vehicle for the weight distribution of the operator as well as the customization of the vehicle for the type of terrain of operation of the central drive personal mobility vehicle 10. First, the right and left adjustment blocks 191 and 192 are adjusted for the weight distribution of the operator. Second, the ground clearance of the right and left leading wheels 91 and 92 are adjusted for the terrain of operation of the central drive personal mobility vehicle 10. The central drive personal mobility vehicle 10 has superior stability for the operator and reduces and/or substantially eliminates the jolting, abruptness and the pitch forward upon deceleration present in the central drive personal mobility vehicle of the prior art.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A central drive personal mobility vehicle, comprising a frame extending between a leading frame end and a trailing frame end thereby defining a leading frame portion, an intermediate frame portion and a trailing frame portion;

said frame having a right and a left frame mounting located in said trailing frame portion of said frame;

a seat mounted to said intermediate portion of said frame;

a right and a left drive wheel assembly including a left and a right drive wheel;

a right and a left leaf spring with each of said leaf springs extending between a proximal end and a distal end;

said proximal ends of said right and left leaf springs being secured to said right and left drive wheel assemblies, respectively;

said distal ends of said right and left leaf springs being secured to said right and left frame mountings, respectively, for resiliently mounting said right and left drive wheel assemblies to said frame; and a right and a left wheel extending from said right and left drive wheel assemblies for enabling said right and left leaf springs to simultaneously resiliently mount said right and left drive wheels and said right and left wheels relative to said frame.

2. A central drive personal mobility vehicle as set forth in claim 1, wherein said leading frame portion and said trailing frame portion are adapted to receive a leading and a trailing battery.

3. A central drive personal mobility vehicle as set forth in claim 1, wherein said distal ends of said right and left leaf springs are secured to said right and left frame mountings for positioning said right and left drive wheels substantially below said seat.

4. A central drive personal mobility vehicle as set forth in claim 1, wherein said right and left frame mountings include a right and a left socket for removably receiving said distal ends of said right and left leaf springs for removably securing said right and left drive wheel assemblies to said frame.

5. A central drive personal mobility vehicle as set forth in claim 1, wherein said right and left frame mountings removably secure said distal ends of said right and left leaf springs for removably securing said right and left drive wheel assemblies to said frame.

6. A central drive personal mobility vehicle as set forth in claim 1, wherein said right and left drive wheel assemblies are secured to said frame solely by said right and left leaf springs.

7. A central drive personal mobility vehicle as set forth in claim 1, including means for adjusting the effective stiffness of said right and left springs.

8. A central drive personal mobility vehicle as set forth in claim 1, including a right and a left adjustment block interposed between said frame and said right and left leaf spring, respectively; and said right and left adjustment blocks being movable for adjusting the effective stiffness of said right and left springs.

9. A central drive personal mobility vehicle as set forth in claim 1, wherein said right and left drive wheel assemblies include a right and a left drive motor for driving said right and left drive wheels.

10. A central drive personal mobility vehicle as set forth in claim 1, wherein said right and left drive wheel assemblies include a right and a left gear box; and said right and left leaf springs being secured to said right and left gear boxes for extending toward said trailing frame end of said frame.

11. A central drive personal mobility vehicle as set forth in claim 1, wherein said right and left drive wheel assemblies comprise a right and a left gear box;

a right and a left motor connected to said right and left gear boxes for driving said right and left drive wheels;

said right and left leaf springs being secured to said right and left gear boxes for extending toward said trailing frame end of said frame; and a linking bar pivotably interconnecting said right and left gear boxes for independently suspending said right and left drive wheels.

12. A central drive personal mobility vehicle as set forth in claim 1, wherein said seat is rotatably mounted to said intermediate portion of said frame.

13. A central drive personal mobility vehicle as set forth in claim 1, wherein said right and left wheels include a right and a left leading wheel rigidly secured to said right and left drive wheel assemblies; and said right and left leading wheels being resiliently secured relative to said frame by said right and left leaf springs.

14. A central drive personal mobility vehicle as set forth in claim 1, including a right and a left trailing wheel pivotably connected to said frame.

15. A central drive personal mobility vehicle as set forth in claim 1, including a generally U-shape trailing wheel support defining a central region and plural terminal ends of said U-shape trailing wheel support;

said central region of said U-shape trailing wheel support being pivotably mounted to said intermediate frame portion; and a right and a left trailing wheel rotatably mounted to said plural terminal ends of said trailing wheel support.

16. A central drive personal mobility vehicle comprising a frame extending between a leading frame end and a trailing frame end thereby defining a leading frame portion, an intermediate frame portion and a trailing frame portion;

said frame having a right and a left frame mounting located in said trailing frame portion of said frame;

a pedestal extending substantially vertically upwardly from said intermediate frame portion of said frame; and a seat being mounted to said pedestal;

a right and a left drive wheel assembly including a left and a right drive wheel;

a right and a left leaf spring with each of said leaf springs extending between a proximal end and a distal end;

said proximal ends of said right and left leaf springs being secured to said right and left drive wheel assemblies, respectively; and said distal ends of said right and left leaf springs being secured to said right and left frame mountings, respectively, for resiliently mounting said right and left drive wheel assemblies to said frame.

17. A central drive personal mobility vehicle, comprising:

a frame extending between a leading frame end and a trailing frame end thereby defining a leading frame portion, an intermediate frame portion and a trailing frame portion;

said frame having a right and a left frame mounting located in said trailing frame portion of said frame;

a seat mounted to said intermediate portion of said frame;

a right and a left drive wheel assembly including a left and a right drive wheel;

a right and a left leaf spring with each of said leaf springs extending between a proximal end and a distal end;

said proximal ends of said right and left leaf springs being secured to said right and left drive wheel assemblies, respectively;

said distal ends of said right and left leaf springs being secured to said right and left frame mountings, respectively, for resiliently mounting said right and left drive wheel assemblies to said frame;

said right and left drive wheel assemblies comprising a right and a left gear box;

a right and a left motor connected to said right and left gear boxes for driving said right and left drive wheels;

said right and left leaf springs being secured to said right and left gear boxes for extending toward said trailing frame end of said frame; and a linking bar interconnecting said right and left gear boxes.

18. A central drive personal mobility vehicle, comprising a frame extending between a leading frame end and a trailing frame end thereby defining a leading frame portion, an intermediate frame portion and a trailing frame portion;

said frame having a right and a left frame mounting located in said trailing frame portion of said frame;

a pedestal extending substantially vertically upwardly from said intermediate frame portion of said frame; and a seat being mounted to said pedestal;

a right and a left drive wheel assembly including a left and a right drive wheel;

a right and a left leaf spring with each of said leaf springs extending between a proximal end and a distal end;

said proximal ends of said right and left leaf springs being secured to said right and left drive wheel assemblies, respectively;

said distal ends of said right and left leaf springs being secured to said right and left frame mountings, respectively, for resiliently mounting said right and left drive wheel assemblies to said frame; and a right and a left wheel extending from said right and left drive wheel assemblies.

19. A central drive personal mobility vehicle comprising:

a frame extending between a leading frame end and a trailing frame end thereby defining a leading frame portion, an intermediate frame portion and a trailing frame portion;

said frame having a right and a left frame mounting located in said trailing frame portion of said frame;

a seat mounted to said intermediate portion of said frame;

a right and a left drive wheel assembly including a left and a right drive wheel;

a right and a left leaf spring with each of said leaf springs extending between a proximal end and a distal end;

said proximal ends of said right and left leaf springs being secured to said right and left drive wheel assemblies, respectively;

said distal ends of said right and left leaf springs being secured to said right and left frame mountings, respectively, for resiliently mounting said right and left drive wheel assemblies to said frame; and a right and a left leading wheel rigidly secured to said right and left drive wheel assemblies, respectively, and located in proximity to said leading frame end of said frame.

20. A central drive personal mobility vehicle, comprising:

a frame extending between a leading frame end and a trailing frame end thereby defining a leading frame portion, an intermediate frame portion and a trailing frame portion;

said frame having a right and a left frame mounting located in said trailing frame portion of said frame;

a seat mounted to said intermediate portion of said frame;

a right and a left drive wheel assembly including a left and a right drive wheel;

a right and a left leaf spring with each of said leaf springs extending between a proximal end and a distal end;

said proximal ends of said right and left leaf springs being secured to said right and left drive wheel assemblies, respectively;

said distal ends of said right and left leaf springs being secured to said right and left frame mountings, respectively, for resiliently mounting said right and left drive wheel assemblies to said frame;

said right and left drive wheel assemblies including a right and a left gear box; and a right and a left leading wheel support extending from said right and left gear boxes for rigidly mounting a right and a left leading wheel relative to said right and left drive wheels.

21. A central drive personal mobility vehicle, comprising a frame extending between a leading frame end and a trailing frame end thereby defining a leading frame portion, an intermediate frame portion and a trailing frame portion;

said frame having a right and a left frame mounting located in said trailing frame portion of said frame;

a seat mounted to said intermediate portion of said frame;

a right and a left drive wheel assembly including a left and a right drive wheel;

a right and a left leaf spring with each of said leaf springs extending between a proximal end and a distal end;

said proximal ends of said right and left leaf springs being secured to said right and left drive wheel assemblies, respectively;

said distal ends of said right and left leaf springs being secured to said right and left frame mountings, respectively, for resiliently mounting said right and left drive wheel assemblies to said frame;

a trailing wheel support pivotably mounted to said intermediate frame portion; and a right and a left trailing wheel rotatably mounted to said support and located in proximity to said trailing frame end of said frame.

22. A central drive personal mobility vehicle, comprising a frame extending between a leading frame end and a trailing frame end thereby defining a leading frame portion, an intermediate frame portion and a trailing frame portion;

said frame having a right and a left frame mounting located in said trailing frame portion of said frame;

a seat mounted to said intermediate portion of said frame;

a right and a left trailing wheel pivotably connected to said frame to be located in proximity to said trailing frame end of said frame;

a right and a left drive wheel assembly including a right and a left drive wheel;

a right and a left leading wheel rigidly secured to said right and left drive wheel assemblies, respectively, and located in proximity to said leading frame end of said frame;

a right and a left leaf spring with each of said leaf springs extending between a proximal end and a distal end;

said proximal ends of said right and left leaf springs being secured to said right and left drive wheel assemblies, respectively; and said distal ends of said right and left leaf springs being secured to said right and left frame mountings, respectively, for resiliently mounting said right and left drive wheel assemblies to said frame for suspending said right and left drive wheels and for simultaneously suspending said right and left leading wheels.

* * * * *